US012680430B2

(12) United States Patent
Boyd et al.

(10) Patent No.: US 12,680,430 B2
(45) Date of Patent: Jul. 14, 2026

(54) UNIBODY BYPASS PLUNGER AND VALVE CAGE

(71) Applicant: Flowco Production Solutions, LLC, Spring, TX (US)

(72) Inventors: Garrett S. Boyd, Granbury, TX (US); Mitchell A. Boyd, Haslet, TX (US)

(73) Assignee: Flowco MasterCo LLC, Houston, TX (US)

( * ) Notice: Subject to any disclaimer, the term of this patent is extended or adjusted under 35 U.S.C. 154(b) by 86 days.

(21) Appl. No.: 18/959,029

(22) Filed: Nov. 25, 2024

(65) Prior Publication Data

US 2025/0092768 A1 Mar. 20, 2025

Related U.S. Application Data

(63) Continuation of application No. 18/441,640, filed on Feb. 14, 2024, now Pat. No. 12,497,873, which is a
(Continued)

(51) Int. Cl.
*E21B 43/12* (2006.01)
*E21B 34/08* (2006.01)
(Continued)

(52) U.S. Cl.
CPC ............ *E21B 43/123* (2013.01); *E21B 34/08* (2013.01); *E21B 43/121* (2013.01); *F04B 47/12* (2013.01);
(Continued)

(58) Field of Classification Search
CPC ...... E21B 43/123; E21B 34/08; E21B 43/121; F04B 47/12; F04B 53/14; F04B 53/143;
(Continued)

(56) References Cited

U.S. PATENT DOCUMENTS

| 1,415,788 A | 5/1922 | Burlin |
| 1,509,386 A | 9/1924 | Wilson |

(Continued)

FOREIGN PATENT DOCUMENTS

| CA | 2428618 A1 | 11/2004 |
| CA | 2618195 A1 | 6/2009 |

(Continued)

OTHER PUBLICATIONS

HPAlloys Website printout or Monel K500 (2004) https://www.hpalloy.com/Alloys/descriptions/MONELK_500.aspx.
(Continued)

*Primary Examiner* — Craig M Schneider
*Assistant Examiner* — Christopher D Ballman
(74) *Attorney, Agent, or Firm* — Jason P. Mueller; FisherBroyles, LLP

(57) ABSTRACT

A bypass plunger includes a unitary or one-piece hollow body-and-valve cage, which retains a dart valve within the valve cage portion of the hollow body using a threaded retaining nut that is secured to the hollow body by crimple detents. A series of helical grooves surround the central portion of the outer surface of the hollow body of the plunger to control spin during descent. A canted-coil-spring disposed within the retaining nut functions as a clutch. The valve cage includes ports that may be configured to control flow through the plunger during ascent.

16 Claims, 11 Drawing Sheets

Related U.S. Application Data continuation of application No. 18/084,376, filed on Dec. 19, 2022, now Pat. No. 11,920,443, which is a continuation of application No. 17/581,301, filed on Jan. 21, 2022, now Pat. No. 11,530,599, which is a continuation of application No. 17/362,563, filed on Jun. 29, 2021, now Pat. No. 11,434,733, which is a continuation of application No. 16/361,651, filed on Mar. 22, 2019, now Pat. No. 11,105,189, which is a continuation of application No. 15/048,491, filed on Feb. 19, 2016, now Pat. No. 10,273,789.

(60) Provisional application No. 62/118,575, filed on Feb. 20, 2015.

(51) Int. Cl.

| | |
|---|---|
| *F04B 47/12* | (2006.01) |
| *F04B 53/14* | (2006.01) |
| *G06F 15/16* | (2006.01) |
| *G06F 16/00* | (2019.01) |
| *G06F 16/10* | (2019.01) |
| *G06F 16/11* | (2019.01) |
| *G06F 16/13* | (2019.01) |
| *G06F 16/14* | (2019.01) |
| *G06F 16/176* | (2019.01) |
| *G06F 16/178* | (2019.01) |
| *G06F 16/18* | (2019.01) |
| *G06F 16/182* | (2019.01) |
| *H04L 67/1095* | (2022.01) |

(52) U.S. Cl.
CPC ............ *F04B 53/14* (2013.01); *F04B 53/143* (2013.01); *G06F 15/16* (2013.01); *G06F 16/00* (2019.01); *G06F 16/10* (2019.01); *G06F 16/122* (2019.01); *G06F 16/128* (2019.01); *G06F 16/13* (2019.01); *G06F 16/14* (2019.01); *G06F 16/176* (2019.01); *G06F 16/178* (2019.01); *G06F 16/182* (2019.01); *G06F 16/1873* (2019.01); *H04L 67/1095* (2013.01); *Y10T 137/7855* (2015.04)

(58) Field of Classification Search
CPC .......... G06F 15/16; G06F 16/00; G06F 16/10; G06F 16/122; G06F 16/128; G06F 16/13; G06F 16/14; G06F 16/176; G06F 16/178; G06F 16/182; G06F 16/1873; H04L 67/1095; Y10T 137/7855
See application file for complete search history.

(56) References Cited

U.S. PATENT DOCUMENTS

| | | | |
|---|---|---|---|
| 1,910,616 A | 5/1933 | Leahy | |
| 1,932,992 A | 10/1933 | Sherman | |
| 2,018,204 A | 10/1935 | Evans | |
| 2,175,770 A | 10/1939 | Dodson | |
| 2,215,751 A | 9/1940 | Coleman | |
| 2,301,319 A | 11/1942 | Peters | |
| 2,312,476 A | 3/1943 | Penick | |
| 2,437,429 A | 3/1948 | Hossfeld | |
| 2,509,922 A | 5/1950 | Hall | |
| 2,642,002 A | 6/1953 | Knox | |
| 2,661,024 A | 12/1953 | Knox | |
| 2,676,547 A | 4/1954 | Knox | |
| 2,714,855 A | 8/1955 | Brown | |
| 2,762,310 A | 9/1956 | Eklund | |
| 2,785,757 A | 3/1957 | Middleton | |
| 2,870,547 A | 1/1959 | Teichman | |
| 2,878,754 A | 3/1959 | Mcmurry | |
| 2,956,797 A | 10/1960 | Polhemus | |
| 2,962,978 A | 12/1960 | Reeves | |
| 2,970,547 A | 2/1961 | Mcmurry | |
| 3,020,852 A | 2/1962 | Roach | |
| 3,055,306 A | 9/1962 | Tausch | |
| 3,090,315 A | 5/1963 | Milton | |
| 3,127,197 A | 3/1964 | Kretzschmar | |
| 3,146,725 A | 9/1964 | Harris | |
| 3,171,487 A | 3/1965 | Ault | |
| 3,181,470 A | 5/1965 | Clingman | |
| 3,304,874 A | 2/1967 | Lyles | |
| 3,395,759 A | 8/1968 | Talley, Jr. | |
| 3,412,798 A | 11/1968 | Gregston | |
| 3,508,428 A | 4/1970 | Matson | |
| 3,806,106 A | 4/1974 | Hamel | |
| 3,861,471 A | 1/1975 | Douglas | |
| 3,944,641 A | 3/1976 | Lemelson | |
| 4,018,248 A | 4/1977 | Carr | |
| 4,030,858 A | 6/1977 | Coles, Jr. | |
| 4,211,279 A | 7/1980 | Isaacks | |
| 4,239,458 A | 12/1980 | Yeatts | |
| 4,440,229 A | 4/1984 | Burch | |
| 4,502,843 A | 3/1985 | Martin | |
| 4,531,891 A | 7/1985 | Coles, III | |
| 4,571,162 A | 2/1986 | Knox | |
| 4,629,004 A | 12/1986 | Griffin | |
| 4,782,896 A | 11/1988 | Witten | |
| 4,793,054 A | 12/1988 | Abbratozzato | |
| 4,896,720 A | 1/1990 | Derouen | |
| 4,932,471 A | 6/1990 | Tucker | |
| 4,951,752 A | 8/1990 | Coleman | |
| 4,966,600 A | 10/1990 | Songer | |
| 4,981,032 A | 1/1991 | Chen | |
| 4,981,448 A | 1/1991 | Herbert | |
| 4,995,459 A | 2/1991 | Mabry | |
| 5,218,763 A | 6/1993 | Marker | |
| 5,253,713 A | 10/1993 | Gregg | |
| 5,280,890 A | 1/1994 | Wydra | |
| 5,417,291 A | 5/1995 | Leising | |
| 5,427,504 A | 6/1995 | Dinning | |
| 5,545,168 A | 8/1996 | Burke | |
| 5,636,761 A | 6/1997 | Diamond | |
| 5,868,384 A | 2/1999 | Anderson | |
| 6,045,335 A | 4/2000 | Dinning | |
| 6,120,505 A | 9/2000 | Huebner | |
| 6,130,978 A | 10/2000 | Limbert | |
| 6,148,923 A | 11/2000 | Casey | |
| 6,176,309 B1 | 1/2001 | Bender | |
| 6,178,309 B1 | 1/2001 | Mizoguchi | |
| 6,200,103 B1 | 3/2001 | Bender | |
| 6,209,637 B1 | 4/2001 | Wells | |
| 6,234,770 B1 | 5/2001 | Ridley | |
| 6,439,780 B1 | 8/2002 | Mudd | |
| 6,467,541 B1 | 10/2002 | Wells | |
| 6,478,087 B2 | 11/2002 | Allen | |
| 6,554,580 B1 | 4/2003 | Mayfield | |
| 6,637,510 B2 | 10/2003 | Lee | |
| 6,644,399 B2 | 11/2003 | Abbott | |
| 6,669,449 B2 | 12/2003 | Giacomino | |
| 6,725,916 B2 | 4/2004 | Gray | |
| 6,745,839 B1 | 6/2004 | Simpson | |
| 6,755,628 B1 | 6/2004 | Howell | |
| 6,808,019 B1 | 10/2004 | Mabry | |
| 6,846,509 B2 | 1/2005 | Chen | |
| 6,848,509 B2 | 2/2005 | Myerley | |
| 6,907,926 B2 | 6/2005 | Bosley | |
| 7,040,401 B1 | 5/2006 | McCannon | |
| 7,055,812 B2 | 6/2006 | Balsells | |
| 7,121,335 B2 | 10/2006 | Murray | |
| 7,243,730 B2 * | 7/2007 | Casey | .................. E21B 43/122 |
| 7,290,602 B2 | 11/2007 | Victor | |
| 7,314,080 B2 | 1/2008 | Giacomino | |
| 7,322,417 B2 | 1/2008 | Rytlewski | |
| 7,328,748 B2 | 2/2008 | Giacomino | |
| 7,383,878 B1 | 6/2008 | Victor | |
| 7,438,125 B2 | 10/2008 | Victor | |
| 7,475,731 B2 | 1/2009 | Victor | |
| 7,513,301 B2 | 4/2009 | Victor | |
| 7,523,783 B2 | 4/2009 | Victor | |
| 7,762,117 B2 | 7/2010 | Faucher | |

(56) References Cited

U.S. PATENT DOCUMENTS

| | | | |
|---|---|---|---|
| 7,819,189 | B1 | 10/2010 | Cosby |
| 7,954,545 | B2 | 6/2011 | Hearn |
| 8,181,706 | B2 | 5/2012 | Tanton |
| 8,286,700 | B1 | 10/2012 | Franchini |
| 8,347,955 | B1 | 1/2013 | Sewell |
| 8,448,710 | B1 | 5/2013 | Stephens |
| 8,464,798 | B2 | 6/2013 | Nadkrynechny |
| 8,627,892 | B2 | 1/2014 | Nadkrynechny |
| 8,713,782 | B1 | 5/2014 | Ralphs |
| 8,757,267 | B2 | 6/2014 | Mitchell |
| 8,863,837 | B2 | 10/2014 | Bender |
| 8,893,777 | B1 | 11/2014 | Garrett |
| 9,068,443 | B2 | 6/2015 | Jefferies |
| 9,358,879 | B1 | 6/2016 | Bennett |
| 9,624,996 | B2 | 4/2017 | Boyd |
| 9,677,389 | B2 | 6/2017 | Boyd |
| 9,683,430 | B1 | 6/2017 | Kuykendall |
| 9,689,242 | B2 | 6/2017 | Kuykendall |
| 9,790,772 | B2 | 10/2017 | Jefferies |
| 9,915,133 | B2 | 3/2018 | Boyd |
| 9,976,548 | B2 | 5/2018 | Zimmerman, Jr. |
| 10,018,015 | B2 | 7/2018 | Purkis |
| 10,060,235 | B2 | 8/2018 | Damiano |
| 10,161,230 | B2 | 12/2018 | Roycroft |
| 10,221,849 | B2 | 3/2019 | Roycroft |
| 10,246,958 | B2 | 4/2019 | Macgregor |
| 10,273,789 | B2 | 4/2019 | Boyd |
| 10,358,899 | B2 | 7/2019 | El Mallawany |
| 10,550,674 | B2 | 2/2020 | Boyd |
| 10,669,824 | B2 | 6/2020 | Boyd |
| 10,677,027 | B2 | 6/2020 | Boyd |
| 10,718,327 | B2 | 7/2020 | Roycroft |
| 10,767,679 | B2 | 9/2020 | Balsells |
| 10,895,128 | B2 | 1/2021 | Thompson |
| 10,907,452 | B2 | 2/2021 | Roycroft |
| D937,982 | S | 12/2021 | Boyd |
| 2002/0005284 | A1 | 1/2002 | Allen |
| 2003/0089160 | A1 | 5/2003 | Weyl |
| 2003/0132004 | A1 | 7/2003 | Suro |
| 2003/0155129 | A1 | 8/2003 | Gray |
| 2003/0198513 | A1 | 10/2003 | Wang |
| 2004/0017049 | A1 | 1/2004 | Fink |
| 2004/0066039 | A1 | 4/2004 | Muhammad |
| 2004/0070128 | A1 | 4/2004 | Balsells |
| 2004/0129428 | A1 | 7/2004 | Kelley |
| 2005/0056416 | A1 | 3/2005 | Gray |
| 2005/0194149 | A1 | 9/2005 | Giacomino |
| 2005/0230120 | A1 | 10/2005 | Victor |
| 2005/0241819 | A1 | 11/2005 | Victor |
| 2006/0024928 | A1 | 2/2006 | Seebauer |
| 2006/0054329 | A1 | 3/2006 | Chisholm |
| 2006/0113072 | A1 | 6/2006 | Lee |
| 2006/0124292 | A1 | 6/2006 | Victor |
| 2006/0124294 | A1 | 6/2006 | Victor |
| 2006/0185853 | A1 | 8/2006 | Bender |
| 2006/0207796 | A1 | 9/2006 | Stewart |
| 2006/0214019 | A1 | 9/2006 | Ollendick |
| 2006/0249284 | A1 | 11/2006 | Victor |
| 2007/0110541 | A1 | 5/2007 | Rawlins |
| 2007/0124919 | A1 | 6/2007 | Probst |
| 2007/0151738 | A1 | 7/2007 | Giacomino |
| 2007/0158061 | A1 | 7/2007 | Casey |
| 2007/0168061 | A1 | 7/2007 | Iefuji |
| 2008/0029271 | A1 | 2/2008 | Bolding |
| 2008/0029721 | A1 | 2/2008 | Miyahara |
| 2008/0253722 | A1 | 10/2008 | Gronvall |
| 2009/0019912 | A1 | 1/2009 | Yu |
| 2009/0229835 | A1 | 9/2009 | Filippov |
| 2009/0308691 | A1 | 12/2009 | Commins |
| 2010/0030240 | A1 | 2/2010 | Brailovski |
| 2010/0038071 | A1 | 2/2010 | Scott |
| 2010/0230160 | A1 | 9/2010 | Ono |
| 2010/0313402 | A1 | 12/2010 | Dierks |
| 2011/0177376 | A1 | 7/2011 | Maguire |
| 2011/0253382 | A1 | 10/2011 | Nadkrynechny |
| 2011/0259438 | A1 | 10/2011 | Osborne |
| 2012/0036913 | A1 | 2/2012 | Johnson |
| 2012/0040557 | A1 | 2/2012 | Marsh |
| 2012/0153801 | A1 | 6/2012 | Kato |
| 2012/0204977 | A1 | 8/2012 | Lembcke |
| 2012/0213478 | A1 | 8/2012 | Chen |
| 2012/0304577 | A1 | 12/2012 | Reid |
| 2012/0305236 | A1 | 12/2012 | Gouthaman |
| 2012/0318524 | A1 | 12/2012 | Lea, Jr. |
| 2013/0020091 | A1 | 1/2013 | Maerz |
| 2013/0133876 | A1 | 5/2013 | Naedler |
| 2014/0090830 | A1 | 4/2014 | Maerz |
| 2014/0116714 | A1 | 5/2014 | Jefferies |
| 2014/0131107 | A1 | 5/2014 | Southard |
| 2014/0131932 | A1 | 5/2014 | Balsells |
| 2014/0190744 | A1 | 7/2014 | Fuzioka |
| 2014/0214084 | A1 | 7/2014 | Jackson |
| 2014/0214097 | A1 | 7/2014 | Jackson |
| 2014/0230940 | A1 | 8/2014 | Patton |
| 2014/0259617 | A1 | 9/2014 | Kompa |
| 2015/0027713 | A1 | 1/2015 | Penisson |
| 2015/0136389 | A1 | 5/2015 | Bergman |
| 2015/0167428 | A1 | 6/2015 | Hofman |
| 2015/0316115 | A1 | 11/2015 | Carter |
| 2015/0322754 | A1 | 11/2015 | Simmons |
| 2016/0010436 | A1 | 1/2016 | Boyd |
| 2016/0061012 | A1 | 3/2016 | Zimmerman, Jr. |
| 2016/0061239 | A1 | 3/2016 | Heaphy |
| 2016/0108710 | A1 | 4/2016 | Hightower |
| 2016/0134028 | A1 | 5/2016 | Kondo |
| 2016/0190712 | A1 | 6/2016 | Hirooka |
| 2016/0238002 | A1 | 8/2016 | Williams |
| 2016/0245417 | A1 | 8/2016 | Boyd |
| 2017/0058651 | A1 | 3/2017 | Damiano |
| 2017/0107802 | A1 | 4/2017 | Kuykendall |
| 2017/0107803 | A1 | 4/2017 | Cedillo |
| 2017/0122084 | A1 | 5/2017 | Brewer |
| 2017/0268318 | A1 | 9/2017 | Roycroft |
| 2017/0362917 | A1 | 12/2017 | Esslemont |
| 2018/0334890 | A1 | 11/2018 | Stadler |
| 2018/0355695 | A1 | 12/2018 | Holland |
| 2019/0203570 | A1 | 7/2019 | Boyd |

FOREIGN PATENT DOCUMENTS

| | | | |
|---|---|---|---|
| CA | 2635993 | A1 | 12/2009 |
| CA | 2763511 | A1 | 1/2011 |
| CA | 2791489 | A1 | 12/2012 |
| EP | 2085572 | A2 | 8/2009 |
| GB | 1458906 | A | 12/1976 |

OTHER PUBLICATIONS

Smalley Steel Ring Company; Constant Section Rings (Snap Rings); product brochure (website); 3 pages https://www.smalley.com/retaining-rings/constant-section-rings.

Weatherford, Plunger Lift Systems brochure, 4 pages; © 2005 Weatherford https://www.weatherford.com/en/products-and-services/production/artificial-lift-systems/plunger-lift/.

Lufkin, Plunger Lift; Bumper Springs website, 2 pages, © 2013 Lufkin Industries, LLC www.lufkin.com.

Bal-Seal, Bal Spring™ Canted Coil Springs for Mechanical Applications, product website, 3 pages, © 2015 Bal Seal Engineering, Inc., www.balseal.com/mechanical.

Lufkin, Lufkin Well Manager Controller for Rod Lift Systems; website, https://www.bhge.com/upstream/production-optimization/artificial-lift/artificial-lift-power-controls-and-automation. 2 pages.

Office Action (Notice of Allowance and Fees Due (PTOL-85)) dated Sep. 30, 2025 for U.S. Appl. No. 18/441,640 (pp. 1-3).

Office Action (Notice of Allowance and Fees Due (PTOL-85)) dated Aug. 18, 2025 for U.S. Appl. No. 18/441,640 (pp. 1-7).

Weatherford, RapidFlo Plunger, weatherford.com, 1376.01, 2 pages.

Office Action (Non-Final Rejection) dated May 19, 2025 for U.S. Appl. No. 18/441,640 (pp. 1-11).

* cited by examiner

UNIBODY BYPASS PLUNGER AND VALVE CAGE

CROSS REFERENCE TO RELATED APPLICATIONS

The present application is a continuation of U.S. application Ser. No. 18/441,640, filed Feb. 14, 2024, which is a continuation of U.S. application Ser. No. 18/084,376, filed Dec. 19, 2022, now U.S. Pat. No. 11,920,443, which is a continuation of U.S. application Ser. No. 17/581,301, filed Jan. 21, 2022, now U.S. Pat. No. 11,530,599, which is a continuation of U.S. application Ser. No. 17/362,563, filed Jun. 29, 2021, now U.S. Pat. No. 11,434,733, which is a continuation of U.S. application Ser. No. 16/361,651, filed Mar. 22, 2019, now U.S. Pat. No. 11,105,189, which is a continuation of U.S. application Ser. No. 15/048,491, filed Feb. 19, 2016, now U.S. Pat. No. 10,273,789, which claims the benefit of U.S. Provisional Application No. 62/118,575, filed Feb. 20, 2015. The contents of all of the above-listed applications is incorporated herein by reference.

BACKGROUND OF THE INVENTION

1. Field of the Invention

The present invention generally relates to gas lift devices for rejuvenating low-producing or non-productive oil or gas wells, and more particularly to improvements in the design and construction of bypass plungers.

2. Background of the Invention and Description of the Prior Art

A conventional bypass plunger is a device that is config- ured to freely descend and ascend within a well tubing, typically to restore production to a well having insufficient pressure to lift the fluids to the surface. It may include a self-contained valve—also called a "dart" or a "dart valve" in some embodiments—to control the descent and ascent. Typically the valve is opened to permit fluids in the well to flow through the valve and passages in the plunger body as the plunger descends through the well. Upon reaching the bottom of the well, the valve is closed, converting the plunger into a piston by blocking the passages that allow fluids to flow through the plunger. With the plunger con- verted to a piston, blocking the upward flow of fluids or gas, the residual pressures in the well increase enough to lift the plunger and the volume of fluid above it toward the surface. Upon reaching the surface, the fluid is passed through a conduit for recovery, the valve in the plunger is opened by a striker mechanism, and the plunger descends to repeat the cycle.

In a typical bypass plunger the valve is similar to a poppet valve, with a valve head attached to one end of a valve stem, such as an intake valve of an internal combustion engine. The valve head, at the inward end of the stem, may be configured to contact a valve seat within the hollow body of the plunger. The stem protrudes outward of the bottom end of the plunger body. A clutch device may surround the stem of the valve to retard and control the motion of the stem and thereby maintain the valve in an open or closed configura- tion during respectively the descent or ascent of the plunger. The valve thus moves between these two positions to open the flow passages at the surface when the plunger contacts the striker mechanism, and to close the bypass passages at the bottom of the well when the stem strikes the bottom, usually at a bumper device positioned at the bottom of the well. Descent of the plunger is controlled by gravity, which pulls it toward the bottom of the well when the valve is open.

This valve or "dart" may be held open or closed by the clutch—typically a device that exerts circumferential fric- tion around the valve stem. The dart may be held within a hollow cage attached to the plunger by a threaded retainer or end nut at the lower end of the plunger assembly. Thus, the valve reciprocates between an internal valve seat (valve closed) in a hollow space inside the cage and the inside surface of the lower end of the cage (valve open). A conventional clutch is appropriate for some applications, especially when its assembly is well controlled to produce uniform assemblies. Such a clutch may be formed of a bobbin split into two hemispherical halves and surrounded by one or two ordinary coil springs that function as a sort of garter to clamp the stem of the valve or dart between the two halves of the bobbin, thereby resisting the sliding motion of the stem within the bobbin. The clutch assembly is typically held in a fixed position within the cage. Each 'garter' spring is wrapped around its groove and the ends crimped together, typically in a hand operation that is subject to some vari- ability in the tension around the bobbin halves and possible failure of the crimped joint, which could affect the reliability of the clutch when in a downhole environment.

While generally effective in lifting accumulated fluids and gas of unproductive wells such conventional bypass plung- ers tend to be complex and suffer from reliability problems in an environment that subjects them to high impact forces, very caustic fluids, elevated temperatures and the like. Various ways have been attempted to simplify construction of bypass plungers, improve their reliability and perfor- mance, and to reduce the cost of manufacture. However, failures remain common, and a substantial need exists to eliminate the causes of these failures. What is needed is a bypass plunger design that solves the structural problems with existing designs and provides a more reliable and efficient performance in the downhole environment.

SUMMARY OF THE INVENTION

Accordingly there is provided a bypass plunger compris- ing a unitary hollow plunger body and valve cage formed in one piece having first and second ends, the valve cage formed at the second end, and the valve cage having internal threads at its distal end for receiving a retaining nut having external threads at one end thereof; a poppet valve having a valve head connected to a valve stem, the poppet valve reciprocatingly disposed within the valve cage such that the valve head is oriented toward a valve seat formed within the hollow body; a retaining nut having external threads formed in the outer surf ace thereof and corresponding to internal threads formed in the distal end of the valve cage to retain the poppet valve within the valve cage; and at least one helical groove formed for at least one-half revolution around the outer surface of the hollow plunger body for a portion of the length of the hollow body approximately midway between the first and second ends.

In another embodiment, there is provided a bypass plunger comprising a unitary hollow plunger body and cage, the valve cage formed at a lower end thereof and configured with internal threads at its lower end for receiving a retaining nut having external threads at one end thereof; a poppet valve having a valve head connected to a valve stem and reciprocatingly disposed within the valve cage; and a retain- ing nut having external threads for closing the lower end of the valve cage to retain the poppet valve within the valve cage; and at least two crimples to lock the retaining nut to the valve cage.

In another embodiment there is provided a bypass plunger comprising a unitary hollow plunger body and valve cage, the valve cage formed at a lower end thereof and configured with internal threads at its lower end for receiving a retaining nut having external threads at one end thereof; a poppet valve having a valve head connected to a valve stem and reciprocatingly disposed within the valve cage; a retaining nut having external threads for closing the lower end of the valve cage to retain the poppet valve within the valve cage; a continuous helical groove machined into a central portion of the hollow body midway between upper and lower ends thereof and having a predetermined pitch, depth, and profile according to required spin and rate of descent of the bypass plunger through a well tubing; first and second crimple detents extending inward from the surface of the valve cage at the second end of hollow body and along first and second opposite radii of the valve cage into corresponding relieved spaces in the proximate external threads formed in the outer surface of the retaining nut; and a canted coil spring disposed within a circumferential groove formed into the inside wall of the retaining nut such that the canted coil spring exerts a substantial radial clamping force on the stem of the poppet valve, thereby forming a clutch to retard the motion of the poppet valve between open and closed positions.

Accordingly there is provided a clutch assembly for a bypass plunger having a valve cage and a reciprocating dart valve, the dart valve having a round stem and disposed within the valve cage, the clutch assembly comprising: a partition nut, threadably installed within an internal thread of an open end of the valve cage following installation of the dart valve in the valve cage; a split bobbin assembly having first and second hemispherical halves, each half of the split bobbin assembly having formed there around at least one circumferential groove, and the assembly installed on the stem of the dart valve; a coil spring disposed in each circumferential groove to secure the split bobbin assembly around a stem of the dart valve, thereby forming the clutch assembly; a retaining nut threadably installed within the internal thread of the valve cage following installation of the clutch assembly within the valve cage; and at least first and second crimples formed into the outer surface of the valve cage and extending into relieved spaces formed in an external thread formed on each one of the retaining nut and the partition nut.

In another embodiment there is provided a clutch for a bypass plunger having a reciprocating valve, comprising a clutch body formed as a circular split bobbin assembly having first and second halves, the assembly defined by a central axis, an inside radius, an outside radius, and first and second opposite faces normal to the central axis; a circumferential groove disposed in the surface defined by the outside radius of the split bobbin assembly; and a canted-coil spring disposed in the circumferential groove to secure the split bobbin assembly around a valve stem.

Accordingly there is provided a dart valve for a bypass plunger, the dart valve disposed to move reciprocatingly within a valve cage of the bypass plunger between seated and unseated positions and constrained by a clutch mechanism within the valve cage or its retaining nut, comprising a poppet valve comprising a valve stem and a valve head; a valve head connected to one end of the valve stem, the valve head including a sealing face to make sealing contact with a valve seat within the bypass plunger; and the valve stem includes a predetermined surface profile for moderating tension produced by the clutch mechanism during the reciprocating motion of the poppet valve.

In another embodiment there is provided an improved valve dart assembly for a one-piece hollow plunger body and valve cage of a bypass plunger, the valve cage formed at a lower end of the hollow plunger body and configured with internal threads at its open lower end, the improvement comprising a poppet valve having a valve head connected to a valve stem and reciprocatingly disposed within the valve cage; a retaining nut having external threads at one end thereof for engaging internal threads formed in the open lower end of the valve cage to retain the poppet valve within the valve cage; and a canted coil spring disposed within a circumferential groove formed into the inside wall of the retaining nut such that the canted coil spring exerts a substantial radial clamping force on the stem of the poppet valve, thereby forming a clutch to retard the motion of the poppet valve between open and closed positions.

DETAILED DESCRIPTION OF THE INVENTION

Figure 1:
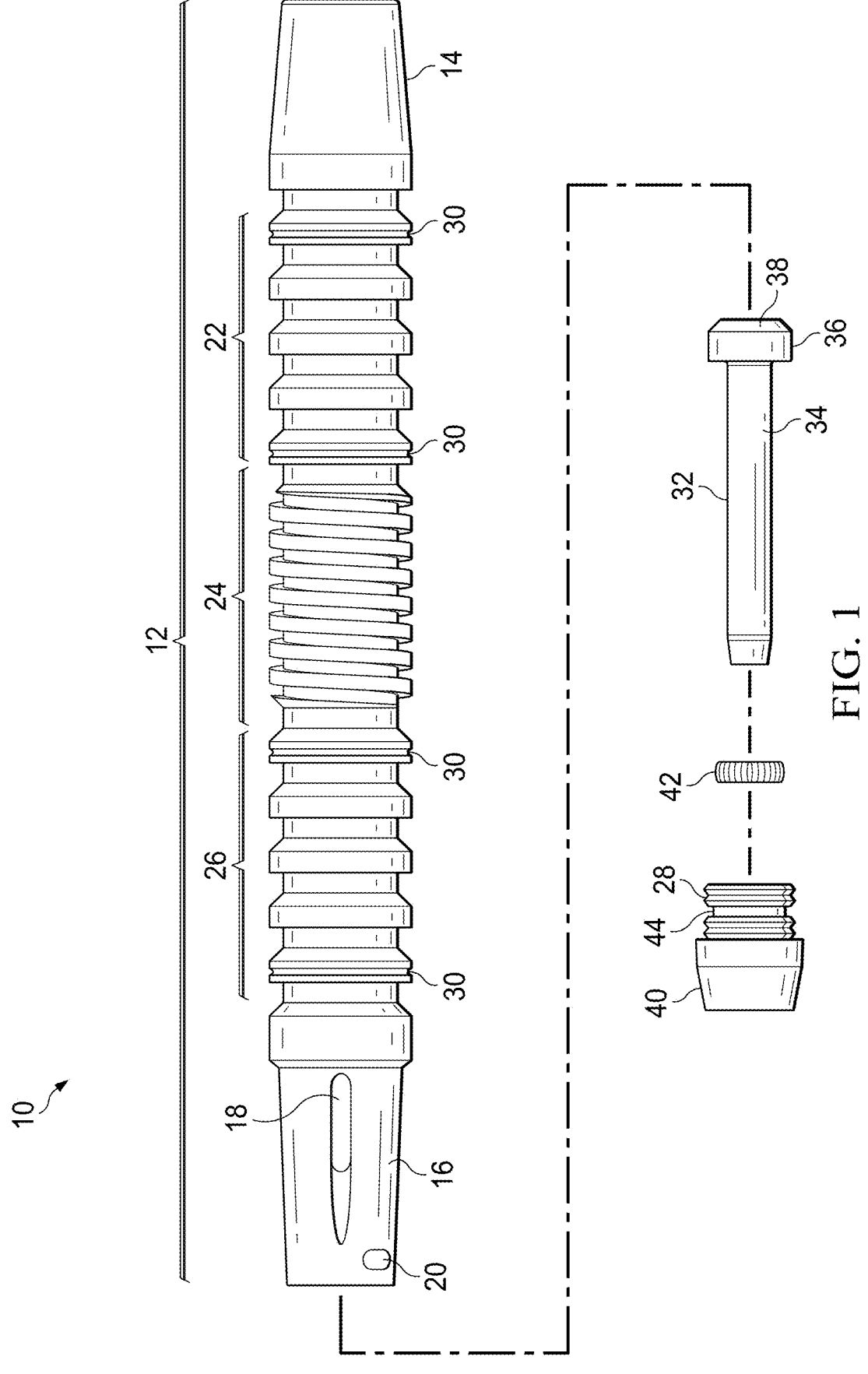
FIG. 1 illustrates a side exploded view of one embodiment of a bypass plunger according to the present invention.

In an advance in the state of the art, the novel bypass plunger described herein with the aid of the accompanying drawings yields improvements in a number of areas. The result is a novel combination of four essential features incorporated in a unibody bypass plunger (aka unibody gas lift plunger) as disclosed herein. The principle components of the unibody bypass plunger include the one-piece hollow plunger body and the integral valve cage formed at its lower end. The valve cage assembly includes a valve dart and a clutch mechanism enclosed within the cage. A retaining nut (or end nut) that retains the valve dart and clutch mechanism within the cage completes the valve dart cage assembly. The novel features of the present invention provide reduction of manufacturing costs, and enhanced performance, durability, and reliability, advantages that result through substantially greater simplicity of design and construction. The features of this novel combination are described as follows.

One feature is a one piece or unitary hollow body and cage with flow ports in the integral valve cage (disposed at the lower end of the plunger body) that can be altered to control the flow of fluid through the plunger on descent. During descent, the plunger falls through the well and any fluids therein. The fluids flow though the angled ports in the valve cage and the hollow body of the plunger. The ports in the cage may be oriented at different angles, varied in number, relieved, etc. to adjust the rate of descent. This unitary design minimizes the number of parts and the number of joints that must be formed and secured. One principle benefit of the one-piece or "unibody" construction is fewer parts to assemble and secure together, and the elimination of failures in the mechanisms used to secure the parts together.

The valve cage at the lower end and the end cap (if used) at the upper end are mated to the respective ends of the hollow plunger body with threaded joints and secured with a crimp ("crimple") formed in at least two equally spaced locations around the hollow body. The crimple functions as an inward-formed dent that effectively indents the wall of the valve cage portion of the hollow body into a corresponding relief machined into the external threads of the (smaller) outside diameter of the retaining nut. The retaining nut (alternately "end nut"), thus threadably secured to the lower end of the valve cage, functions to close the open end of the valve cage and retain the poppet valve within the valve cage. The crimple feature eliminates the need for separate parts such as pins, screws, ball detents, lock nuts or washers, etc, to lock a threaded joint from loosening. The advantage of the crimple technique and mechanism is to more reliably prevent the inadvertent disassembly of the components secured to the bypass plunger with screw threads, thereby ensuring a true unibody bypass plunger that remains a single unit throughout many cycles of use. The term crimple is a contraction of the terms crimp and dimple, to characterize the crimp as approximating a crimp at a defined point as compared with a circumferential crimp.

The outer surface of the hollow plunger body of the present invention includes a series of concentric rings or ridges machined into the outer surface of the hollow body for approximately one third the overall length of the hollow body at each end. The rings or ridges thus provided act as a seal to minimize the clearance between the plunger and the inside of the well tubing through which it descends and ascends. In the present invention, between these two groups of concentric rings, one group at each end of the hollow body, is a series of concentric spiral (or helical) grooves (not unlike the "valleys" of screw threads) machined into the central portion of the outer surface of the hollow body. The "central" portion may typically (but not exclusively) be approximately the central one-third of the length of the hollow body. The pitch and profile of these spiral grooves may be varied between a tight helix and an open helix to vary the rate of spin of the plunger as it descends and ascends. The purpose of spinning the plunger is to prevent flat spots from forming on the outside surface of the plunger, which reduce the effectiveness and the useful life of the bypass plunger. The cross section profile of the grooves may also be varied to facilitate the spin rate.

The "clutch" of one embodiment of the present invention consists of a canted-coil garter spring disposed within a circumferential groove inside the end nut. In other words, no bobbin is used, split or otherwise; just the canted coil spring that is disposed within its groove and wrapped 360 degrees around the stem of the valve dart. As used in the inventive plunger, the coils of the spring as formed are canted in the direction of its torroidal centerline (i.e., a line passing through the center of each coil of the spring) in a circumferential direction around the stem diameter. The coils of the canted coil spring, unlike a conventional coil spring in which the coils are disposed substantially at right angles to the centerline of the spring, are disposed at an acute angle relative to the centerline of the spring. This configuration allows the spring to exert tension at right angles to its centerline against the outside diameter surface of the valve dart stem. This property is enhanced when the outer diameter of the canted-coil spring is constrained by a cylindrical bore or in a groove surrounding the spring. The surface of the valve dart stem in one embodiment is preferably machined to a surface roughness of approximately 8 to 50 microinches, a standard specification for a very smooth finish. The canted coil spring is supplied in a 360 degree form with its ends welded together (thereby forming a torroidal shape), enabling it to be dimensioned to fit within a machined groove in the end nut or retaining nut. Advantages of this design include elimination of the bobbin components and greater durability.

In the appended drawings, reference numbers that appear in more than one figure refer to the same structural feature. The drawings depict at least one example of each embodiment or aspect to illustrate the features of the present invention and are not to be construed as limiting the invention thereto. In addition, several alternative embodiments of a clutch mechanism for a plunger valve that utilizes canted-coil springs, and several alternative embodiments of a plunger valve dart having different valve stem profiles are included to suggest the scope of modifications that may be made to these components without departing from the concepts employed in the present invention. It should be understood that the term "plunger dart" or simply "dart" may also be named a poppet valve or a valve dart herein, all of which refer to the same component.

FIG. 1 illustrates a side exploded view of one embodiment of an integrated, unibody bypass plunger according to the present invention. The unibody bypass plunger 10 is formed as a single hollow plunger body 12 machined from a suitable material such as a stainless steel alloy. Such materials are well known in the art. Forming the hollow plunger body as a single piece simplifies construction by reducing the number of parts to be connected together with screw threads, thereby reducing the opportunities for failure when a threaded joint fails. Further, the profiles of the flow ports in the valve cage 16, the sealing rings 22, 26, and the centralized helix 24 may all be readily tailored during manufacture for a specific application. The plunger body includes the following defined sections: an ID fishing neck 14, an upper section of sealing rings 22, an intermediate or central section of helical ridges or grooves 24, a lower section of sealing rings 26, and a valve cage 16 for enclosing and retaining a poppet valve or valve dart 32. The valve cage 16 includes a plurality of flow ports 18 disposed at typically two to four equally-spaced radial locations around the valve cage 16. In the illustrated embodiment, two or more crimples 20 to be described may be positioned as shown near the lower end of the hollow body 12/cage 16 unit. The crimple 20 provides a mechanism to lock a retaining nut or end nut 40 threaded on the open, lower end of the valve cage 16. The hollow body 12 may further include wear grooves 30 disposed at selected ones of the sealing rings 22, 26 as shown. Further, disposed within the retaining or end nut 40 when the bypass plunger is assembled is a canted-coil spring 42 that functions as a clutch. This novel clutch design, which does not require use of a bobbin or similar structure, will be described herein below.

Figure 4:
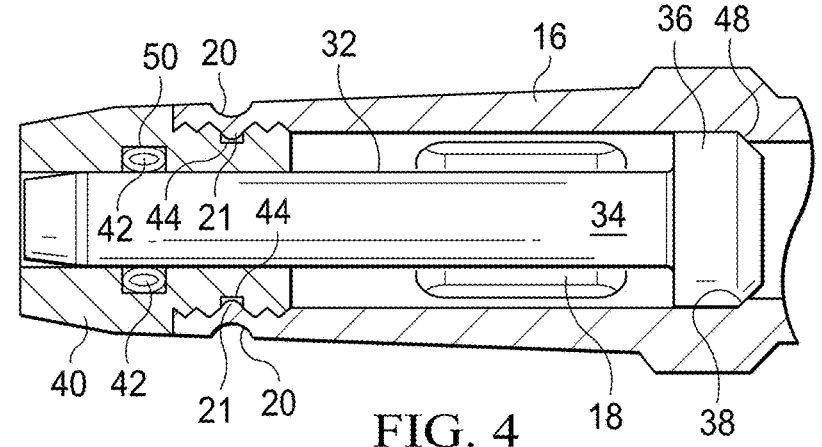
FIG. 4 illustrates a cross section detail view of the lower end of the embodiment of FIG. 2 with the valve shown in a closed position.

Continuing with FIG. 1, the assembly of the bypass plunger 10 includes a valve dart 32 inserted head-end first through the valve cage 16 into the lower end of the hollow body 12. The valve head 36 and its sealing face 38 form a poppet valve head at the end of stem 34. When installed in the hollow body 12, the sealing face 38 of the poppet valve or dart 32 is shaped to contact a valve seat 48 machined into the internal bore 52 of the hollow body 12 as shown in FIG. 4 that depicts the valve dart 32 in a closed position. The valve dart 32 may be retained within the valve cage 16 by the end nut 40 that may be installed in the lower end of the valve cage 16 and secured by screw threads 28 (See FIG. 7). The end nut 40 includes in this embodiment an external circular groove 44 around part of its threaded portion. This groove 44 provides a relieved space so that a crimple 20 to be described may extend into the groove 44 to lock the external threads of the end nut 40 to corresponding internal threads in the lower end of the valve cage 16. The end nut 40 also preferably includes a canted-coil spring 42 (to be described) disposed into an internal circumferential groove 50 (See FIG. 5). The canted-coil spring 42 replaces a conventional clutch often used with dart-equipped plungers and provides a simpler and more effective structure to retard or break the motion of the valve stem as it moves between open and closed positions.

Figure 2:
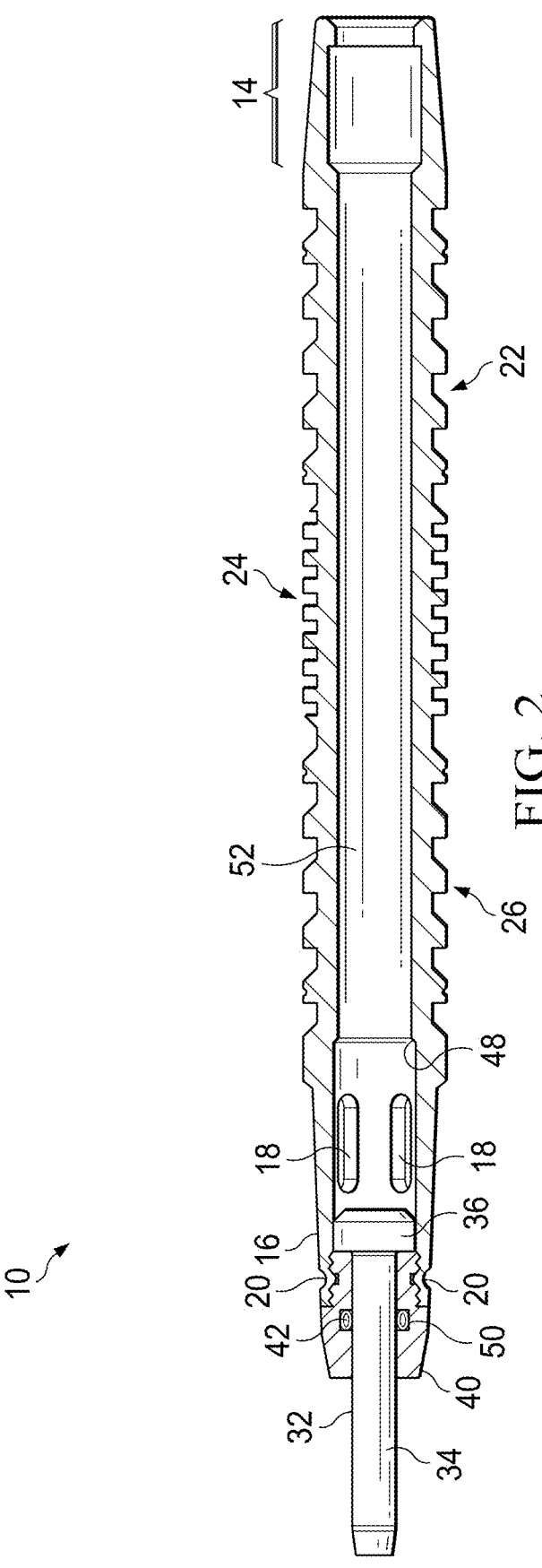
FIG. 2 illustrates a cross section view of the embodiment of FIG. 1 as assembled.

FIG. 2 illustrates a partial cross section view of the embodiment of FIG. 1 as assembled to depict the relationship of several internal features of the bypass plunger 10. The valve dart 32, shown in its open position for descent, is confined within the valve cage 16 by the retaining nut 40. The canted-coil spring 42 surrounds the stem 34 of the valve dart 32 to retard its motion within the valve cage 16. The canted-coil spring 42 is retained within the circumferential groove 50 machined into the inner bore of the retaining nut 40, as more clearly shown in FIGS. 3-6. The inner bore 52 of the hollow body 12 includes valve seat 48 and flow ports 18 cut through the wall of the valve cage 16. One example of the profiles of the sealing rings 22, 26 and the helical grooves 24 are also depicted in FIG. 2.

Figure 3:
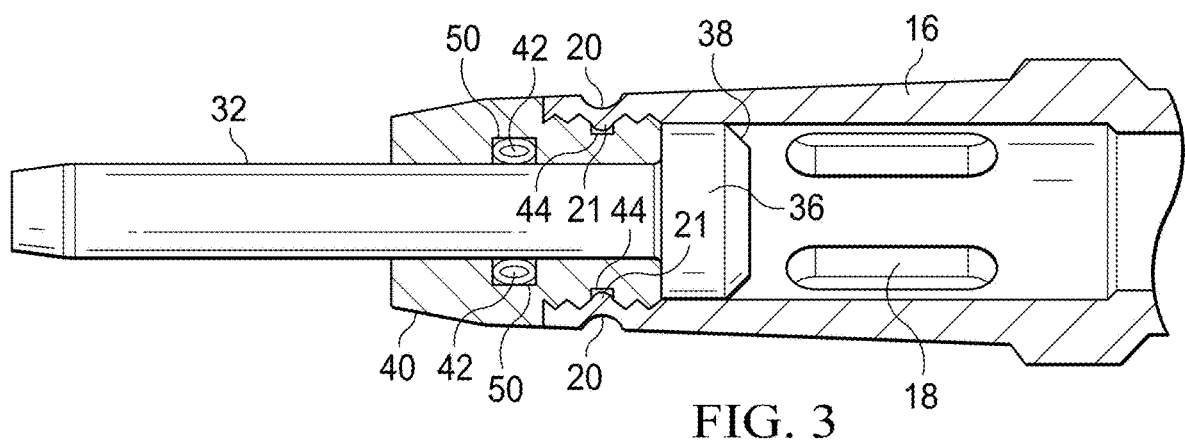
FIG. 3 illustrates a cross section detail view of the lower end of the embodiment of FIG. 2 with the valve shown in an open position.

FIG. 3 illustrates a cross section detail view of the lower (valve cage 16) end of the embodiment of the bypass plunger 10 shown in FIG. 2 with the valve dart 32 in an open position. FIG. 3 also depicts the use of a crimple 20 that deforms the wall of the valve cage 16 so that an extended portion of the crimple 20—the crimp 21, formed as a dent in the outer surface of the valve cage 16—protrudes into a relieved portion 44 of the screw threads of the retaining or end nut 40. Persons skilled in the art will appreciate that the relieved portion 44 may be machined as a drilled hole of limited depth or a punched opening that may be round, oval, or rectangular in shape. In some cases, the formation of the crimple on the outer surface of the valve cage may extend into the threads of the retaining nut 40 sufficiently to prevent the retaining nut from loosening.

The crimple 20 thus functions similar to a set screw or a pin to prevent the loosening of the screw threads. This feature is shown and described in greater detail for FIGS. 7 and 8. In the claims or in the description of the present invention, which includes a one-piece or "unitary" hollow plunger body and valve cage, the crimple feature may be variously described and understood as being disposed in the "hollow body" or in the "valve cage" portion of the hollow body. Moreover, persons skilled in the art will recognize that the crimple feature is a technique that may be used in place of set screws, pins, etc., to secure threaded components from turning relative to each other. For example, end nuts at either end of a plunger body or a bumper spring or other similarly constructed device, may employ a crimple as described herein to useful advantage.

FIG. 4, which is similar to FIG. 3, illustrates a cross section detail view of the lower end of the embodiment of the valve cage (16) portion of the bypass plunger shown in FIG. 2 with the valve dart 32 in a closed or seated position, with the sealing face 38 of the valve head 36 seated against the valve seat 48 inside the valve cage 16, and the opposite end of the valve dart 32 slightly retracted—e.g., no more than about 0.030 inch—within the end of the retaining nut 40.

Figure 5:
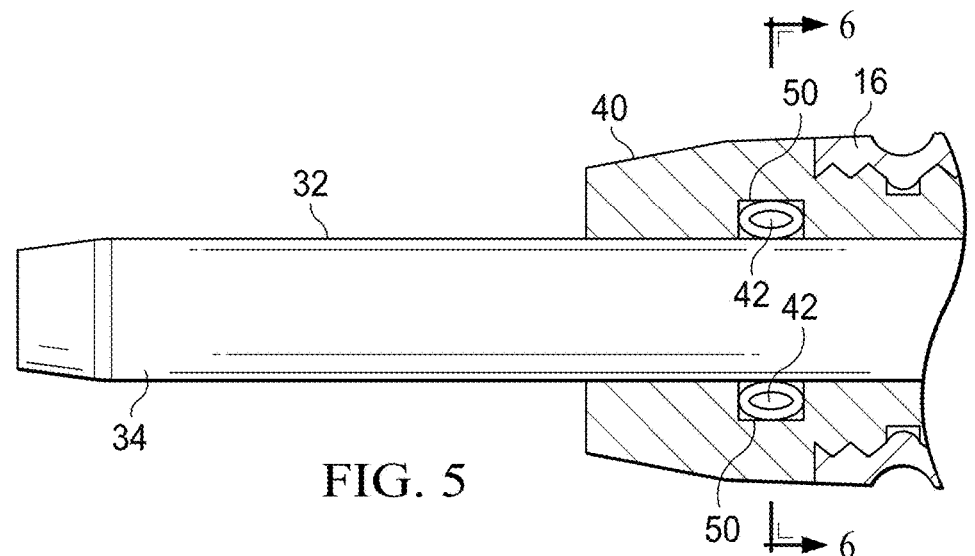
FIG. 5 illustrates a side cross section detail of an end (retaining) nut and canted coil spring for use with the embodiment of FIGS. 1-4.

FIG. 5 illustrates a side cross section detail of the end (retaining) nut 40 and the canted-coil spring 42 for use with the embodiment of FIGS. 1-4. In this illustrated embodiment the canted-coil spring 42 is disposed within a circumferential groove 50 inside the end nut 40. The canted-coil spring 42 provides a clutch action on the stem 34 of the valve dart 32 without using a bobbin, split or otherwise. Only the canted-coil spring 42 that is disposed within its groove 50 and wrapped 360 degrees around the stem 34 of the valve dart 32 acts to restrain the motion of the dart valve 32. As used in the illustrated bypass plunger 10, the coils of the spring 42 as formed are canted in the direction of its centerline, that is, in a circumferential direction around the stem 34 diameter.

The coils of the canted-coil spring, unlike a conventional coil spring in which the coils are disposed substantially at right angles to the centerline of the spring, are disposed at an acute angle relative to the centerline of the spring 42. This configuration allows the canted coils of spring 42 to exert tension radially inward at right angles to its centerline against the outer surface of the valve stem 34. The particular specifications of the canted-coil spring, such as the material used for the spring wire, its overall diameter, the diameter of the coils, the acute angle the coils form relative to the centerline of the spring, etc., may be selected to suit the particular dimensions of the bypass plunger, its expected environment, and other conditions of use. The performance of the canted-coil spring design is facilitated by the surface finish provided on the surface of the stem 34. Optimum performance is provided when the surface finish, preferably produced by machining, is held within the range of 8 to 50 microinches.

Advantages of this bobbinless, canted-coil spring design include at least the following: (a) reduction in the number of components required to provide the clutch function; (b) the canted-coil spring 42 is supported in a more confined space, reducing the likelihood of failure during hard impacts; (c) the need to assemble a split bobbin-with-garter springs clutch is eliminated—the canted-coil spring is simply inserted into its circumferential groove 44; and (d) the use of a conventional clutch bobbin assembly is eliminated. These advantages arise from the simplicity and the construction of the canted-coil spring.

Unlike a typical garter spring, which as supplied is simply a coil spring that must be formed into a circle and the ends typically crimped together (a hand-assembly operation that is prone to errors such as in cutting to length and crimping, etc.), the canted-coil spring 42 is supplied to specification with the ends welded and the circular, torroidal-form coil properly dimensioned and configured for the particular application. Also unlike the garter spring, the canted-coil spring 42 need only be inserted into the circumferential groove 50 in the end nut 40, while the garter spring must be assembled onto the split bobbin; again a more complex hand-assembly operation. Thus the use of the canted-coil spring 42 ensures a leaner manufacturing process of a bypass plunger 10 that is substantially more reliable because of the more durable spring, and the more consistent tension it provides. These features markedly improve the impact resistance of the shifting mechanism (the valve cage 16, end nut 40, and canted-coil spring 42) of the unibody bypass plunger 10 disclosed herein.

Continuing with FIG. 5, the surface of the stem 34 is preferably machined and finished to a surface roughness of approximately 8 to 50 microinches. The combination of the radial tension and the specified surface finish provides the appropriate amount of friction to control the motion of the valve dart 32 between the open and closed positions of the stem 34 of the valve dart 32. As noted above, the advantages of this design include elimination of the bobbin components and greater durability.

There are several alternate surface finishes to be illustrated and described (See FIGS. 15 through 18)—combinations of recesses, grooves, undercuts, and surface roughness—that may be applied to the stem 34 of the valve dart 32 to limit or control the shifting of the valve dart 32 during operation of the bypass plunger 10. These features can improve the operation of the bypass plunger under a variety of conditions while descending or ascending in the well tubing. For example, recesses such as snap ring grooves may be located at strategic locations along the stem 34 to prevent the stem 34 from sliding too easily within the canted-coil spring 42 or restrain the sliding when the bypass plunger encounters a condition that it might otherwise interpret as contacting the striker at the surface or the bumper spring at the bottom of the well.

Figure 6:
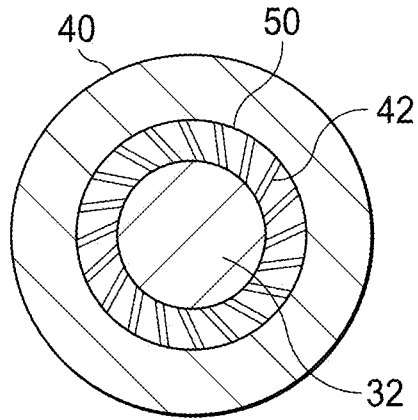
FIG. 6 illustrates an end cross section detail of the end (retaining) nut and canted coil spring depicted in FIG. 5, for use with the embodiment of FIGS. 1-4.

FIG. 6 illustrates an end cross section detail of the end (retaining) nut 40 and canted-coil spring 42 surrounding the stem 34 of the valve dart 32 for use with the embodiment of FIGS. 1-4. As shown, the canted coil spring is supplied in a 360 degree form that is dimensioned to fit within the machined groove 50 in the end nut 40.

Figure 7:
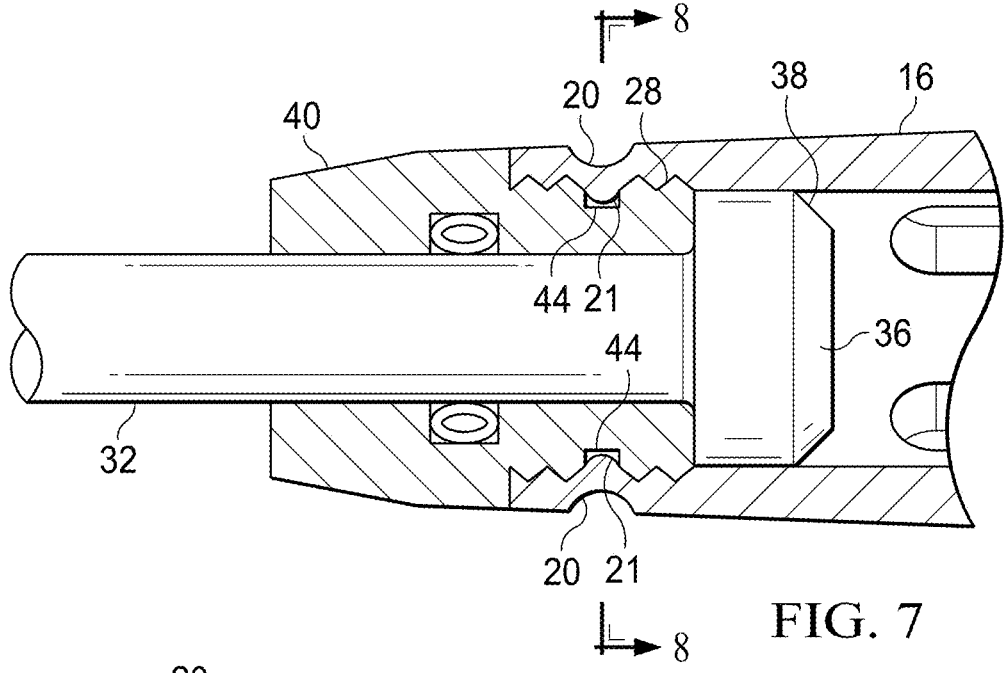
FIG. 7 illustrates an enlarged version of FIG. 3.

FIG. 7 illustrates an enlarged version of FIG. 3 to depict the form of the crimple 20 used to lock the retaining or end nut 40 to the valve cage 16. The crimple embodiment is an effective technique for locking the threaded joint between the retaining or end nut 40 and the valve cage 16. This form of locking the joint also acts to prevent loosening, thereby extending the life of the joint. As shown, the crimple 20 is formed as a detent 20, 21 into the outer surface of the valve cage 16. The dent or crimple 20 extends radially inward through the threads 28 of the retaining or end nut 40 and valve cage 16 and into the circumferential recess 44 (shown in cross section in FIG. 7). The detent 20, 21 may be approximately rectangular in cross section to enable the narrower dimension to extend more readily into the recess 44.

Figure 8:
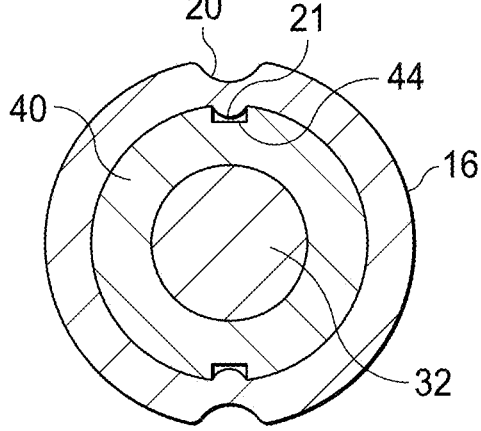
FIG. 8 illustrates an end cross section view of the embodiment depicted in FIG. 7.
Figures 18, 19:
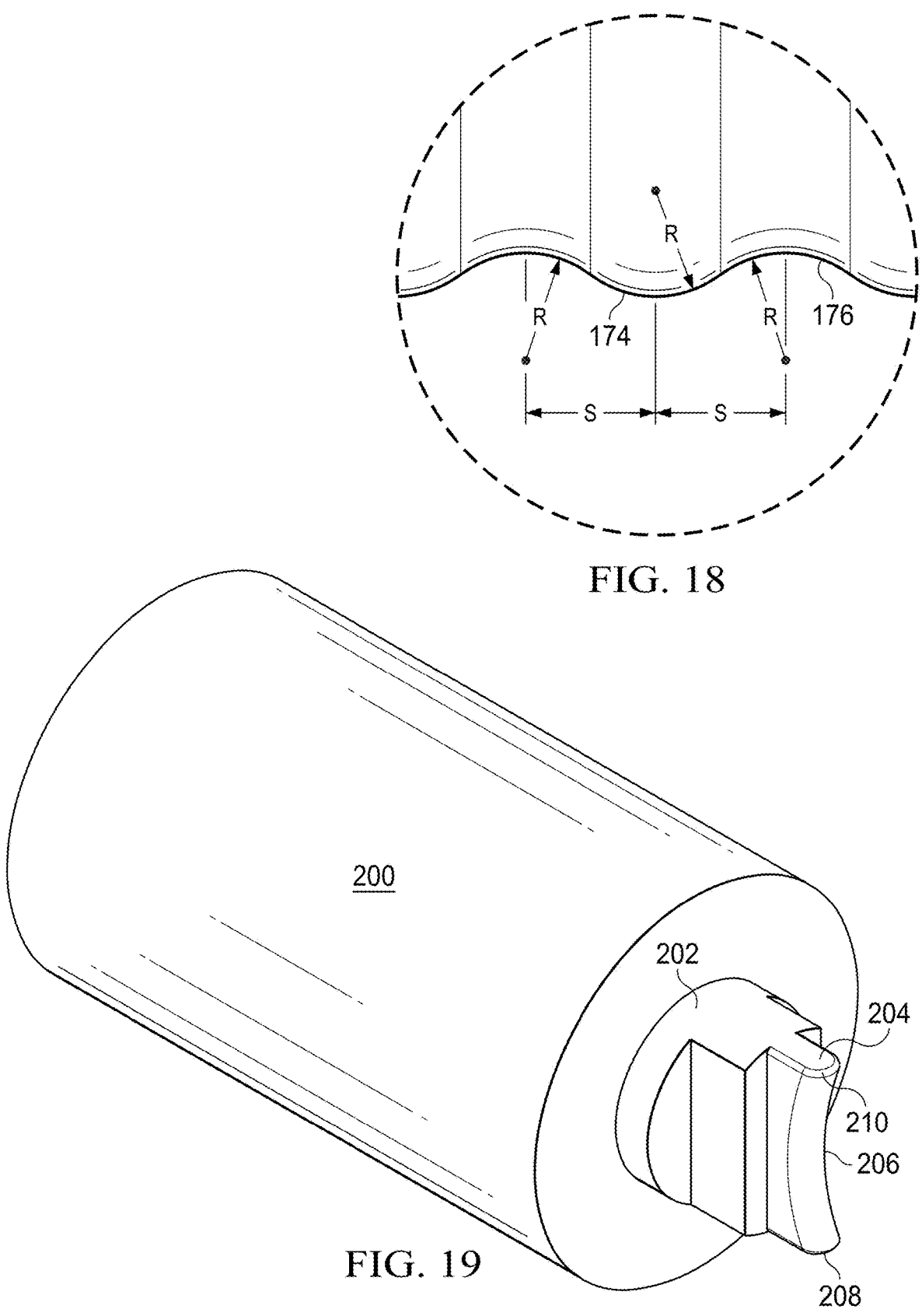
FIG. 18 illustrates a detail view of the profile of a feature of the embodiment of FIG. 17.
FIG. 19 illustrates a die for use in a press to form a crimple used in the embodiments of FIGS. 3, 4, 7, and 8.

Alternatively, the profile of the detent 20, 21 may be approximately conical in form, as though formed by a center punch having a conical point. In practice, the crimple detent 20, 21 may be formed using a press as is well-known in the art. One preferred example of a die used in a press to form the crimple is illustrated in FIG. 19 to be described. The detent 20, 21 is preferably placed in at least two locations, on opposite sides of the valve cage 16—i.e., approximately 180 degrees apart around the body of the valve cage 16 as shown in FIG. 8, which illustrates an end cross section view of the embodiment depicted in FIG. 7.

Figures 9, 10:
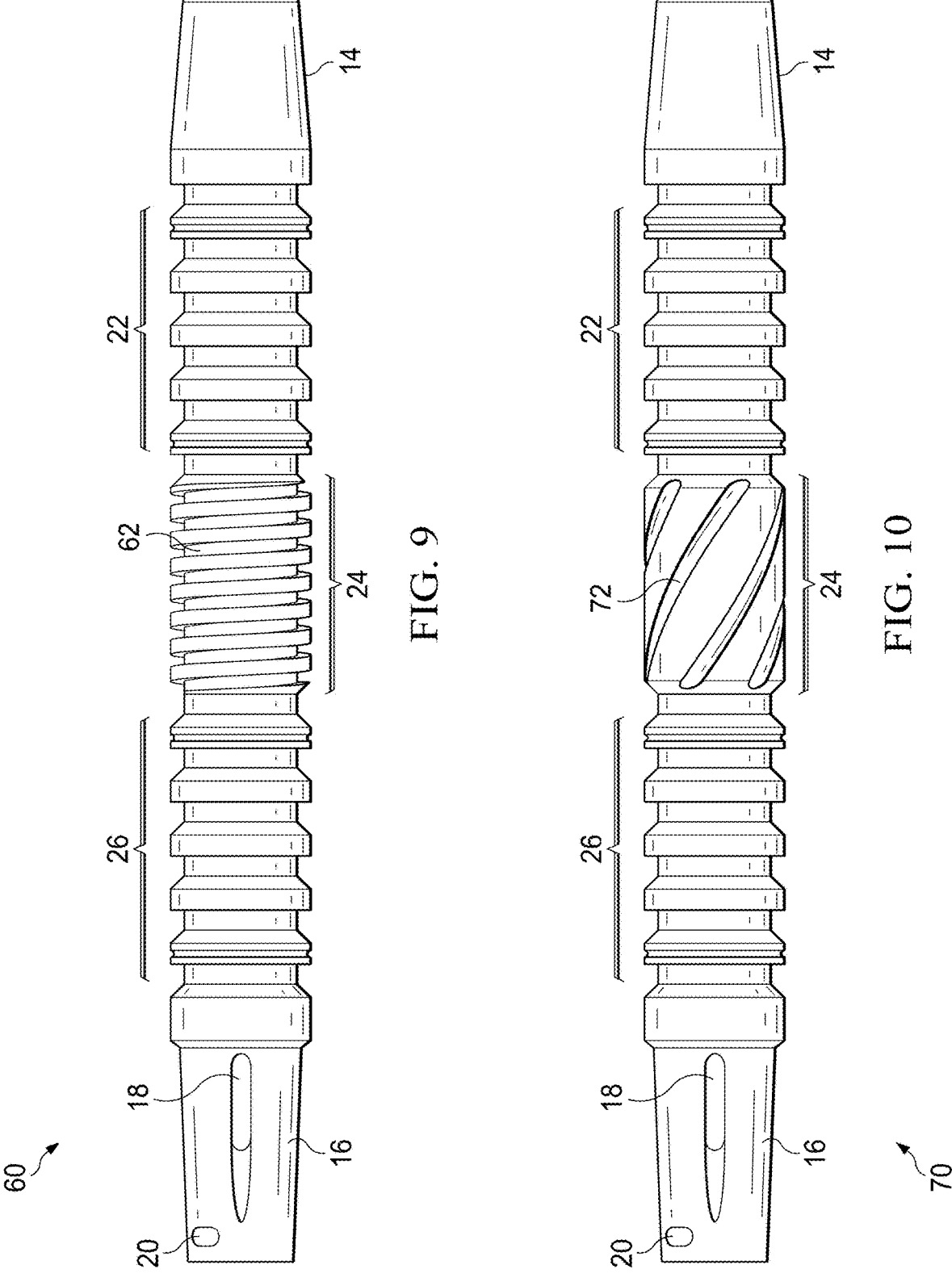
FIG. 9 illustrates a side view of a hollow body according to the present invention having a tight helix profile disposed in a central portion of the embodiment of FIG. 1.
FIG. 10 illustrates a side view of a hollow body according to the present invention having an open helix profile disposed in a central portion of the embodiment of FIG. 1.

FIG. 9 illustrates a side view of a hollow body bypass plunger 60 according to the present invention. The plunger of FIG. 1 is depicted in FIG. 9 with a groove surrounding the central portion of the body of the plunger and forming a tight helix profile 62. FIG. 10 illustrates a side view of a hollow body bypass plunger 70 according to the present invention having a more open helix profile 72 formed of several grooves, also disposed in a central portion 24 of the plunger 70. The helical feature disposed in the central portion 24 of the plungers 60, 70 may be called a centralized helix that is formed to cause the plunger to rotate as it ascends and descends or travels up and down through the well bore. Since the seal provided by the sealing rings 22, 26 is not total, fluids and gases escape past the sealing rings 22, 26. As the plunger 60, 70 passes through the well bore, the fluids and gases impart a torque to the plunger 60, 70 by the mechanism of the helical grooves 62, 72 respectively. The result is a reduction in the occurrence of flat spots along the outside diameter of the sealing rings 22, 26 of the body of the plunger 60, 70 and consequent longer life.

The continuous helical groove machined into the central portion of the hollow body midway between the upper and lower ends thereof may have a predetermined pitch, depth, and profile. The variation in the pitch of the helical grooves 62, 72 as shown in FIGS. 9 and 10 provides a means of varying the rate of spin imparted to the bypass plungers 60, 70. In the example of FIG. 9, a single helical groove 62 encircles the body of the plunger 60 from one up to as many as eight times. Lengthening the fluid path around the plunger 60 tends to reduce the spin rate of the plunger 60. In the example of FIG. 10, a plurality of helical grooves, typically three or four (but could be from one to as many as twelve) spaced at equal intervals around the plunger body 60 provides a shorter fluid path around the plunger 70 to increase the spin rate of the plunger 70. In applications where the number of helical grooves is greater than the typical number of three to four, the width of the helical grooves may be proportionately narrowed as the number of grooves is increased.

It is important to note that the central helix 62, 72 is positioned mid-way between the sealing rings so as not to impair the sealing function of the sealing rings 22, 26 yet still provide a mechanism to cause the plunger 60, 70 to rotate during its up-and-down travels. Moreover, experience has shown that placing the helical grooves near the ends of the plunger body 60, 70 causes the outside diameter of the plunger to wear faster, reducing the profile depth and effectiveness of the helical grooves and reducing the life of the bypass plunger 60, 70.

The concept of the centralized helix may also be used with good effect in sand plungers used in sand-producing wells by improving the movement of the plunger through sand-bearing fluid because of the rotation imparted to the sand plunger. The rotation may also tend to keep the helical grooves—and the space between the plunger body and the well tubing free of sand build-up through the effects of centrifugal force.

One of the usual components of a dart or poppet valve as used in a bypass or gas-lift plunger is some form of clutch to restrain the motion of the dart, thereby ensuring the efficient operation of the dart in controlling the operation of the plunger. A conventional split-bobbin clutch may employ a circular bobbin split into two equal hemispherical halves to enable convenient assembly around the stem of the dart or poppet valve. The two halves are generally held against the stem by one or more (usually two) so-called "garter springs" disposed in grooves surrounding the bobbin assembly. Each bobbin half encircles the stem for slightly less than a full 180 degrees, so that the inside surface of each bobbin half may make direct contact with the stem of the dart under the tension provided by the garter spring(s). The clutch assembly is generally secured within the body of the plunger through which the dart reciprocates during its use. The clutch, through the friction exerted against the stem, acts to damp the motion of the stem within the bypass plunger so that it remains in the required closed or opened position during ascent or descent respectively through the well tubing.

Figures 11, 12, 13:
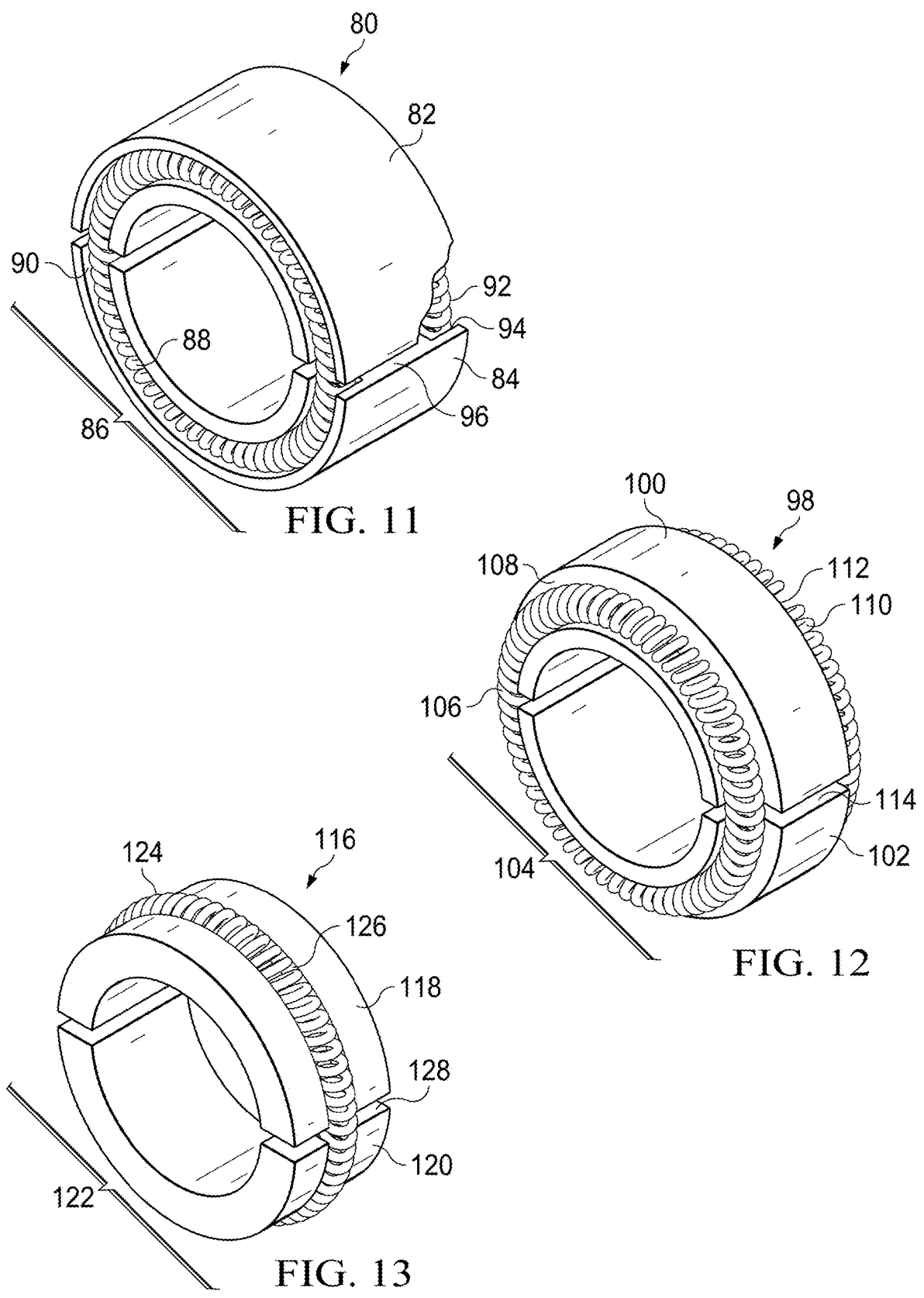
FIG. 11 illustrates a first example of an alternative embodiment of a plunger valve clutch according to the present invention.
FIG. 12 illustrates a second example of an alternative embodiment of a plunger valve clutch according to the present invention.
FIG. 13 illustrates a third example of an alternative embodiment of a plunger valve clutch according to the present invention.

FIGS. 11, 12, and 13 illustrate several alternative embodiments of a split-bobbin clutch assembly for use with darts (or dart valves or poppet valves) to restrain the motion of the dart and to support the dart in its closed and open positions within a bypass plunger. These embodiments differ from conventional clutches in the type of spring used in place of a garter spring and the location of the canted-coil spring on the bobbin assembly. Conventional split bobbin clutches typically use one or two ordinary coil springs that are wrapped around the bobbin assembly and its ends crimped together to form a circular loop around the bobbin. The spring tension of an ordinary coil spring, that acts like a rubber band around the bobbin, exerts an inward force to clamp the bobbin halves around the dart stem. In contrast, the springs used in the clutches illustrated in FIGS. 11, 12, and 13 have their coils canted at an acute angle with the centerline of the spring. That is, the coils of the spring all slant in the same direction, and the ends of the canted-coil spring are permanently secured together by welding during the manufacture of the canted-coil spring. The tension against the stem results from the inherent tension of the slanted (canted) coils, not from the tension in a coil spring stretched around the bobbin and stem. Thus, the spring merely needs to be looped over the bobbin halves during assembly. This results in uniform unit-to-unit clutch assemblies, which translates to greater dependability of the clutch performance under downhole conditions.

The split bobbins of FIGS. 11, 12, and 13 differ from one another in the location of grooves for supporting the canted-coil spring embodiment. FIG. 11 has the grooves positioned in each side face of the bobbin halves as shown. FIG. 12 depicts the grooves formed in the faces of the bobbin but intersecting the outer diameter of the bobbin so that the grooves are formed along the outer edges of the bobbin. FIG. 13 shows a single groove formed around the perimeter of the bobbin, with a canted-coil spring installed in the groove. In this embodiment, a bobbin could be constructed with more than one spring installed; thus FIG. 13 is provided here to illustrate the concept.

It is possible to use a conventional coil spring in the embodiments depicted in each of FIGS. 11, 12, and 13. However, several advantages are provided by the use of a canted-coil spring to hold the bobbin halves together. (1) The manufacturing process of assembling the bobbins is much simpler, involving substantially less hand work and opportunity for errors in assembly. (2) This configuration provides a more consistent tension because the variation between individual ones of the canted-coil springs can be held to a much closer tolerance than ordinary coil springs that must be individually assembled on the bobbin. (3) The impact resistance of the clutches assembled with canted-coil springs is greater because the springs can be specified with stronger spring constants, the ends are more securely fastened, and the inward tension exerted by the canted-coil configuration can be greater and more closely controlled. These advantages provide superior service life and reliability, and lower operating costs, especially important in downhole conditions characterized by high impacts and corrosive substances.

FIG. 11 illustrates a first example of an alternative embodiment of a plunger valve clutch according to the present invention. The clutch 80 is assembled from first 82 and second 84 halves of a split bobbin assembly 86. A first canted-coil spring 88 is installed in groove 90, and a second canted-coil spring 92 is installed in a similar groove 94 that is visible in the cut-away portion of the figure. When assembled on a valve stem, the clutch 86 includes a gap 96 between the first 82 and second 84 halves of the split bobbin assembly 86. The gap 96 ensures that the tension exerted on the stem by the clutch 80 will be maintained.

FIG. 12 illustrates a second example of an alternative embodiment of a plunger valve clutch according to the present invention. The clutch 98 is assembled from first 100 and second 102 halves of a split bobbin assembly 104. A first canted-coil spring 106 is installed in groove 108, and a second canted-coil spring 110 is installed in a similar groove 112 that is not fully visible in FIG. 12 because it is installed on the opposite face of the split bobbin assembly 104. When assembled on a valve stem the clutch 98 includes a gap 114 between the first 100 and second 102 halves of the bobbin assembly 104. The gap 114 ensures that the tension exerted on the stem by the clutch 98 will be maintained.

FIG. 13 illustrates a third example of an alternative embodiment of a plunger valve clutch according to the present invention. The clutch 116 is assembled from first 118 and second 120 halves of a split bobbin assembly 122. A first canted-coil spring 124 is installed in groove 126. If another canted-coil spring is desired, a second groove would be required. When assembled on a valve stem the clutch 116 includes a gap 128 between the first 118 and second 120 halves of the spilt bobbin assembly 122. The gap 128 ensures that the tension exerted on the stem by the clutch 116 will be maintained.

It should be appreciated by persons skilled in the art that a single canted-coil spring is adequate for most applications because the spring can be manufactured within a given size constraint and spring-constant as assembled to exert the required inward radial force and it is thus not required to perform trial and error operations to select the proper springs.

Figure 14:
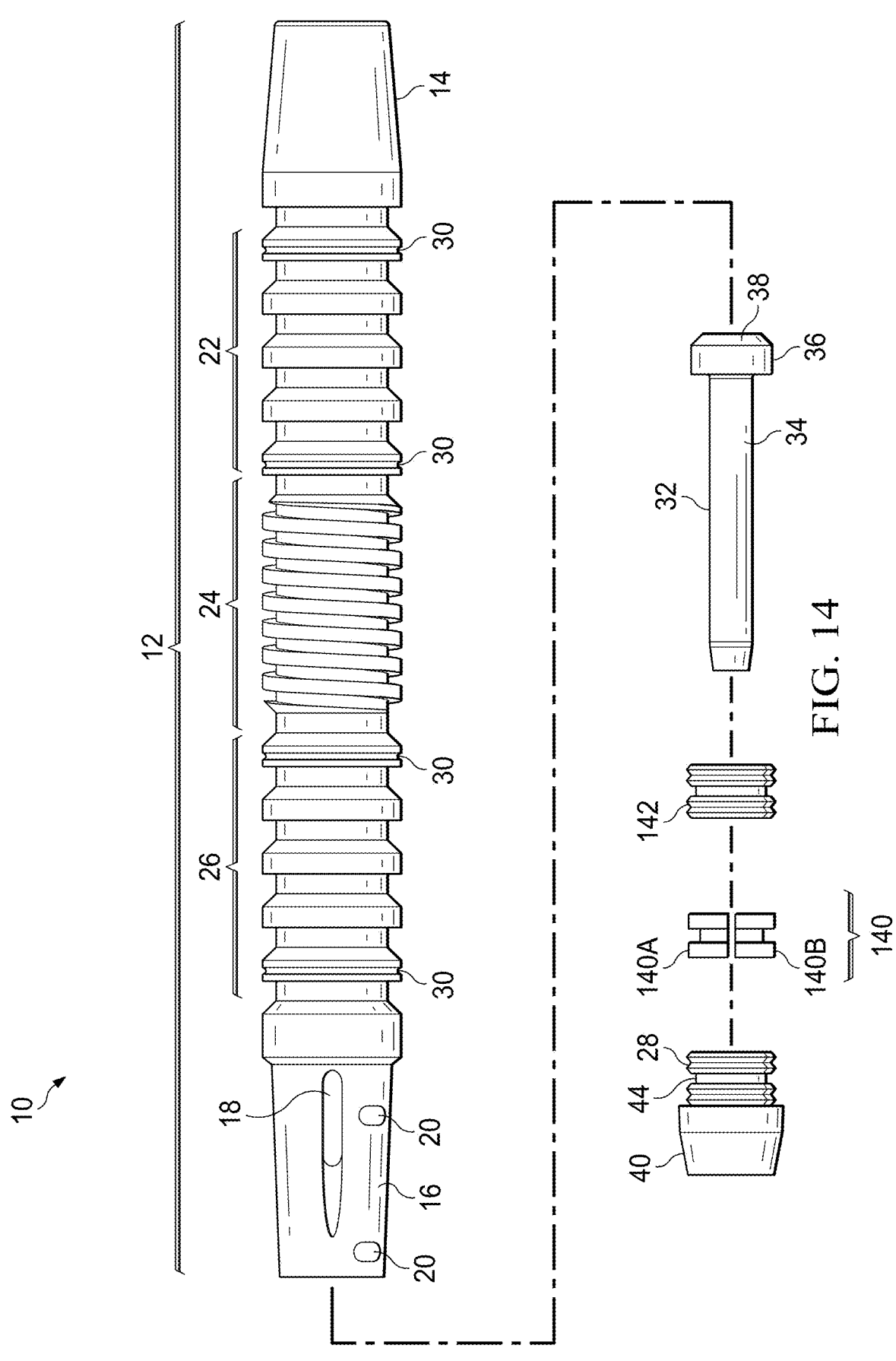
FIG. 14 illustrates an alternate embodiment of the bypass plunger of FIG. 1 that uses a split bobbin clutch.

FIG. 14 illustrates an alternate embodiment of the present invention that is similar to the embodiment of FIG. 1 except FIG. 14 is shown with a split bobbin clutch assembly 140 instead of the canted coil spring 42 as shown in FIG. 1. The clutch assembly 140, which is an assembly of the split bobbin halves 140A, 140B, is shown without a garter spring for clarity. The split bobbin halves 140A, 140B may be encircled by one garter (or canted coil) spring as shown or two garter springs in the manner of FIGS. 11, 12, and 13. A partition nut 142, for retaining the clutch assembly 140 between the retaining or end nut 40 and the partition nut 142, is shown adjacent to the clutch bobbin halves 140A, 140B. The partition nut 142 is provided to ensure the clutch assembly 140 (and garter or canted coil spring) remains in position between the end nut 40 and the partition nut 142.

FIGS. 15 through 18 illustrate several embodiments of the valve stem 34 portion of the valve dart. These embodiments describe surface finishes or profiles including several examples of alternative surface profiles for moderating the reciprocating motion of the valve stem within the clutch structure of the unibody bypass plunger 10.

Figure 15:
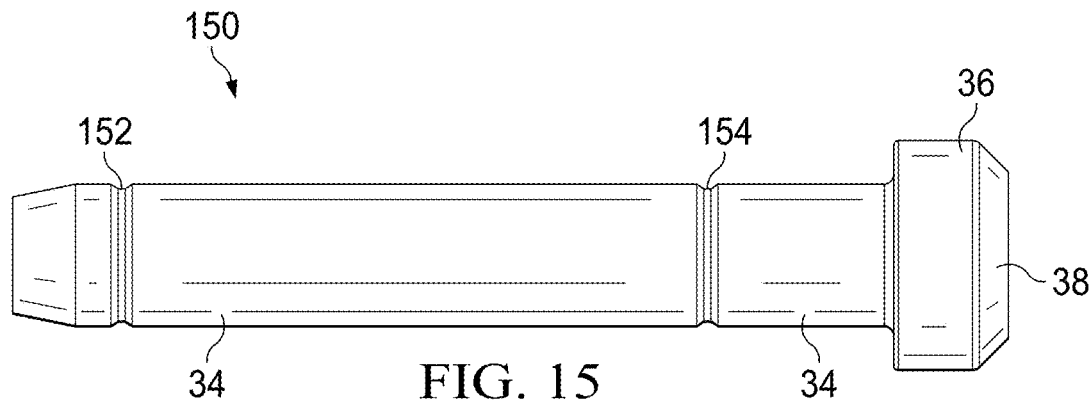
FIG. 15 illustrates a first example of an alternate embodiment of a plunger valve dart according to the present invention.

FIG. 15 illustrates a first example of an alternate embodiment of a plunger valve dart 150 according to the present invention. The valve dart 150 includes first 152 and second 154 grooves that encircle the stem 34 near each end of the stem 34. The grooves in the illustrated embodiment are formed as snap-ring grooves, a standard form for retaining snap rings that is easily produced during manufacture of the valve dart 150. In the illustrated embodiment, the snap-ring grooves, in cross section, may be formed as a 0.094 inch radius (R.094, "or, approximately 0.10") into the stem 34, to a depth of approximately 0.01 inch. For other embodiments requiring other bypass plunger body diameters, these dimensions may be varied or scaled according to the dimensions of the bypass plunger and the canted-coil spring to be used with the bypass plunger. The first groove 152 provides a retention feature to position the canted coil spring 42 to retain the valve dart 150 closed as the plunger ascends. The first groove 152 acts to resist vibration effects that might tend to open the valve during ascent. Such intermittent opening and closing of the valve dart reduces the efficiency of the plunger in lifting the fluids and gas to the surface. Similarly, the second groove 154 acts to resist vibration effects that might tend to close the valve during descent. Such intermittent closing of the dart valve 150 reduces the speed of the plunger as it descends from the surface to the bottom of the well to begin a new lift cycle. The stem 34 is preferably machined to a surface roughness of 8 to 50 microinches as in the embodiment shown in FIG. 5.

Figure 16:
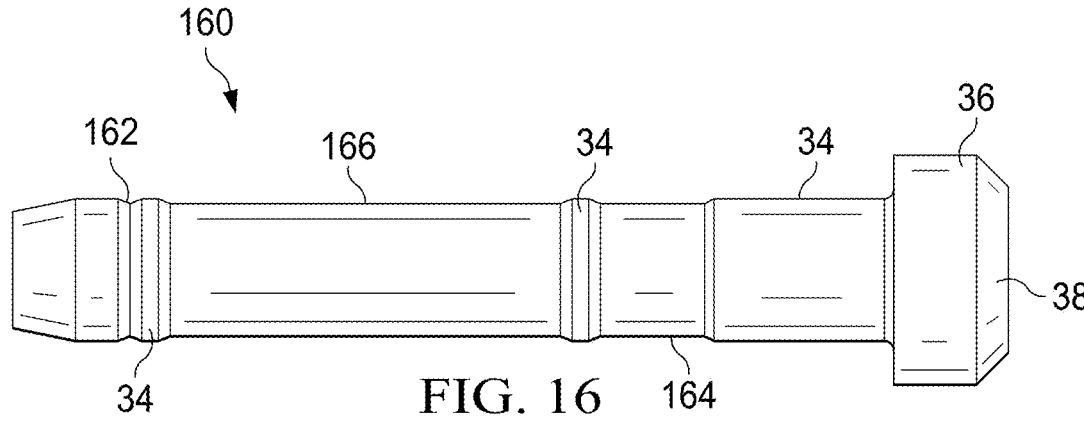
FIG. 16 illustrates a second example of an alternate embodiment of a plunger valve dart according to the present invention.

FIG. 16 illustrates a second example of an alternate embodiment of a plunger dart valve according to the present invention. The dart valve 160 includes first 162 and second 164 grooves or recessed regions that encircle the stem 34 near each end of the stem 34. The first groove 162 in the illustrated embodiment is formed as a snap-ring groove, a standard form for retaining snap rings that is easily produced during manufacture of the dart valve 160. The first groove

162 is provided to enable the canted-coil spring to retain the dart valve 160 in a closed position for ascent of the plunger. The second groove or recessed region 164 at the other end of the stem 34 near the valve head 36 is similar to the first groove or recessed region 162 except that it is substantially wider along the length of the stem 34 to provide a predetermined amount of freedom for the dart valve to open even if it contacts the striker at the surface with less than the expected amount of upward-directed force. The longer intermediate length 166 of the stem 34 is similarly recessed from the nominal stem diameter. This feature, by allowing the valve dart 160 to gain momentum as it moves within the valve cage 16, facilitates the movement of the stem 34 of the dart valve 160 through the restraining action of the canted-coil spring 42 as the dart valve moves between open and closed positions. The surface is preferably machined to a surface roughness of 8 to 50 microinches as in the embodiment shown in FIG. 5.

Figure 17:
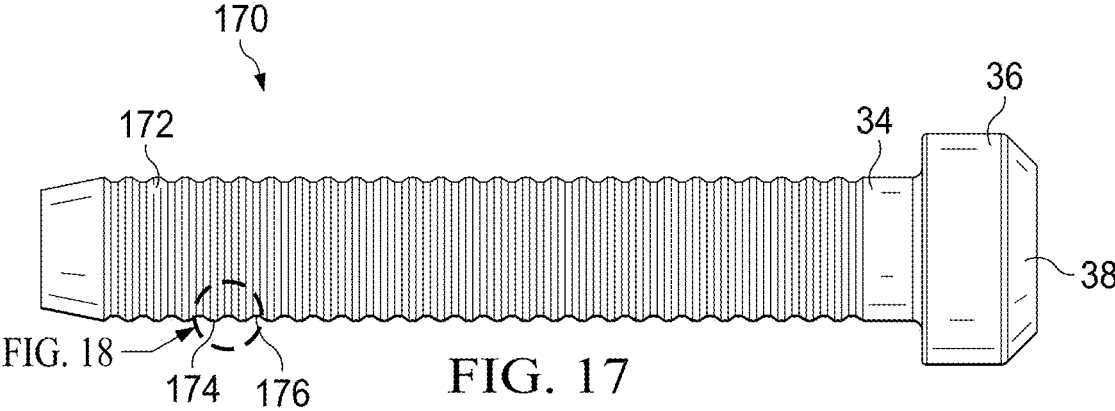
FIG. 17 illustrates a third example of an alternate embodiment of a plunger valve dart according to the present invention.

FIG. 17 illustrates a third example of an alternate embodiment of a plunger dart valve according to the present invention. In this embodiment of the dart valve 170, substantially the entire length of the stem 34 includes a surface profile 172 formed of closely-spaced alternating ribs and grooves having a substantially uniform profile—for instance resembling a sinusoidal wave in the illustrated example—as depicted in the detail view of FIG. 18 to be described. This dart valve 170 is designed for use with the split bobbin clutch designs illustrated in FIGS. 11, 12, and 13 described herein above.

FIG. 18 illustrates a detail view of the profile of a feature of the embodiment of FIG. 17, wherein the alternating rib-and-groove profile is more clearly shown. The surface profile 172 of the stem 34, shown in cross section in FIG. 17 illustrates both the ribs 174 and the grooves 176 formed according to a radius Rand separated by a spacing S. The radius R may be within the range of 0.020 inch to 0.150 inch and the spacing S between an adjacent crest and trough may be within the range of 0.020 inch to 0.075 inch. The values of Ron a particular valve stem should be constant and the values of S on a particular valve stem should be constant.

FIG. 19 illustrates one example of a die for use in a press to form a crimple used in the embodiments of FIGS. 3, 4, 7, and 8. The body 200 of the die includes a reduced diameter shank 202 that is shaped at its end to form the crimple 20 in the outer surface of the valve cage 16 portion of the unibody bypass plunger body 12. The crimple 20 is shown in detail in FIGS. 3, 4, 7, and 8. The crimple 20, an indentation into the outer surface of the valve cage 16, is produced by the shape of the crimple blade 204. The crimple blade 204 as shaped includes a major radius 206, a minor radius 208, and a fillet radius 210. The major radius 206 shapes the blade 204 to the radius of the plunger body 12 at the location of the crimple 20. The major radius is formed to a radial dimension slightly larger than the body of the plunger to be formed. Thus, when the blade 204 contacts the plunger body and begins to form the crimple 20, the stresses produced in the metal plunger body 12 tend to flow outward, forming a smoother crimple 20. Different plunger body diameters will, of course require separate dies having the appropriate major radius for the work piece.

The minor radius 208 is provided for a similar reason—to allow the stresses of formation to flow outward along the work piece. A small fillet radius 210 is provided on the outside edges of the blade 204 to reduce stress riser occurrence, a phenomenon well-understood in the machine arts. The operation of the press with the die 200 installed proceeds in a slow, controlled manner, after the work piece— the body 12 of the plunger—is supported in a fixture or vise (the vise is not shown, as it is not part of the invention and is well known to persons skilled in the art) opposite the die 200. This procedure achieves the desired crimp 21 into the recess 44 of the retaining nut 40. The curvatures of the major 206, minor 208, and fillet 210 radii, besides reducing stresses in the metal also retard the formation of cracks, both during manufacturing and during use of the bypass plungers in the field, where the plunger is subject to hard impacts under some conditions.

Figure 20:
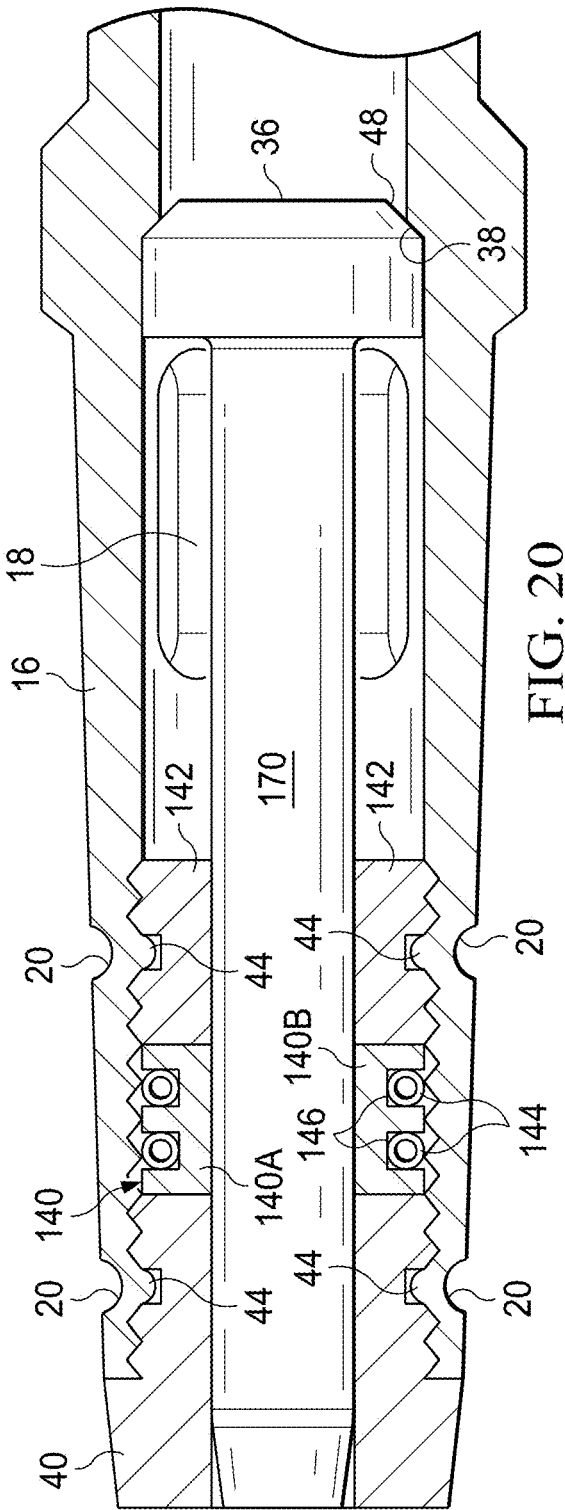
FIG. 20 illustrates an alternate embodiment to FIG. 4, showing a split bobbin clutch assembly for a bypass plunger within a valve cage.

FIG. 20 illustrates an alternate embodiment to FIG. 4, showing a split bobbin clutch assembly 140 for a bypass plunger as disposed within a valve cage. The clutch assembly is held in place between the retaining or end nut 40 and a partition nut 142, both of which are locked in position by the use of a crimple 20. The crimple 20 deforms the wall of the end nut 40 and the valve cage 16, so that an extended portion of the crimples 20—(same as the crimp 21 shown in FIGS. 3 and 4)—protrudes into a respective relieved portion 44 of the screw threads of both the retaining or end nut 40 and the partition nut 142. The crimple 20 thus functions similar to a set screw or a pin to prevent the loosening of the screw threads of the retaining or end nut 40 and the partition nut 142.

The valve dart 170, shown in FIG. 20 in the valve closed (valve seated as in FIG. 4) position within the valve cage 16, has the structure shown in FIG. 17. The surface profile 172 of the valve stem 34 portion of the valve dart 170 is depicted in FIG. 18. The clutch bobbin halves 140A and 140B are held against the stem 34 of the valve dart 170 by springs 144 (which could be canted-coil or conventional coil springs) that are installed in the grooves 146 formed into the circumference of the bobbin halves 140A and 140B. Note that, when the valve dart 170 is seated inside the valve cage 16, the opposite end of the valve dart 170 is slightly retracted—e.g., no more than about 0.030 inch—within the end of the retaining nut 40.

Figure 21:
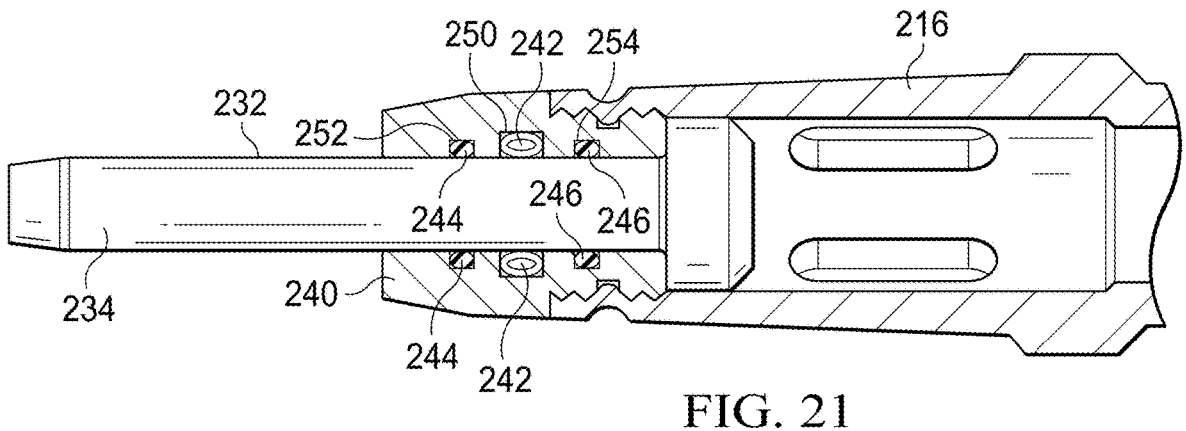
FIG. 21 illustrates a cross section detail view of an alternate embodiment of the lower end of the embodiment of FIG. 3 with the valve shown in an open position.
Figure 22:
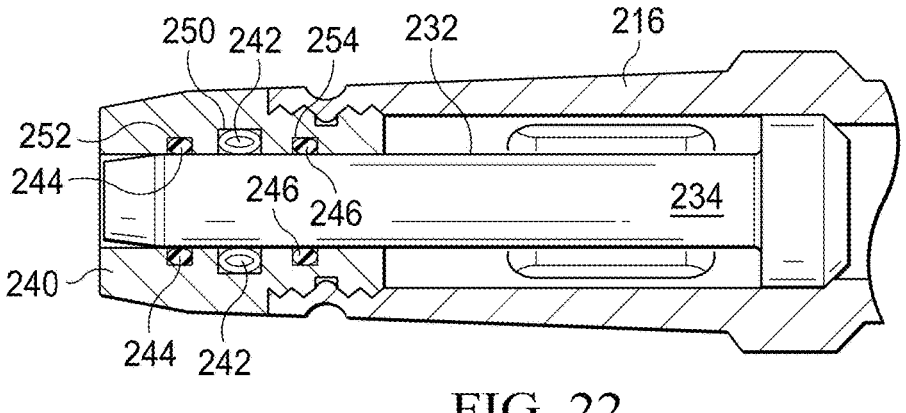
FIG. 22 illustrates a cross section detail view of an alternate embodiment of the lower end of the embodiment of FIG. 4 with the valve shown in a closed position.

Returning to FIGS. 3 and 4, which depict the open and closed state of the dart valves within the valve cage, an alternate embodiment of the valve dart assembly is depicted in FIGS. 21 and 22. The embodiments of FIGS. 3 and 4, and 21 and 22 illustrate dart valves equipped with the canted coil spring that functions as the clutch mechanism. The alternate embodiment of FIGS. 21 and 22 is preferred when the bypass plunger is used in downhole environments where sand is frequently suspended in the fluids being lifted to the surface. It is preferred in this alternate embodiment of the present invention to provide seals on either side of the canted coil spring to minimize the possibility for particles of sand to become lodged in the coils of the canted-coil spring, thereby reducing its effectiveness as a clutch mechanism. The valve dart 232 within the valve cage 216 is shown in open and closed positions or states, respectively, in FIGS. 21 and 22. Included in FIGS. 21 and 22 are first and second "slipper seals" 244, 246, each one installed in respective circumferential grooves 252, 254 formed in the inside bore of the retaining or end nut 240. The slipper seals 244, 246 are disposed on either side of the canted-coil spring 242 installed in its circumferential groove 250 formed in the end nut 240. Like the canted coil spring 242, the slipper seals 244, 246 surround the stem 234 of the valve dart 232, thereby forming a seal against sand or other types of particles becoming trapped within the canted coil spring 242.

The slipper seals 244, 246 may be formed from various ones of the PTFE (polytetraflouroethylene) family of materials as O-rings having a square (or round) cross section.

Alternatives are filled Nylon such as oil-filled Nylon 6 and equivalents Moly-filled Nylon 6, solid lubricant-filled Nylon 6. Other alternatives include semi-crystalline, high temperature engineering plastics based on the PEEK (polyetheretherketone) or PAEK (polyaryletherketone) polymers.

While the invention has been shown in only one of its forms, it is not thus limited but is susceptible to various changes and modifications without departing from the spirit thereof. For example, canted-coil springs may be used to advantage in split bobbin clutches as described herein. Further, the profiles of the helical grooves and the flow ports in the cage, the surface finishes, the relative placements of the canted coil spring within the retaining nut attached to the cage, the form of the poppet valve—its stem, valve head, and the corresponding valve seat in the plunger body, the number of canted coil springs used within the retaining nut or in a split bobbin clutch assembly, the shape of the crimple and the die used to form it, are some illustrative examples of variations that fall within the scope of the invention. Moreover, the crimple feature is a technique that may be used in place of set screws, pins, etc., to secure threaded components from turning relative to each other. For example, end nuts at either end of a plunger body or a bumper spring or other similarly constructed device, may employ a crimple as described herein to useful advantage. The canted-coil spring used as a clutch may also be used in other structures for controlling sliding or reciprocating motion of a shaft within the bore of a corresponding structure of a device.

In regard to the use of a canted-coil spring in a clutchless embodiment of a valve dart assembly, several of the disclosed embodiments may use split bobbin clutch assemblies in the claimed combinations, wherein canted-coil springs or conventional coil springs may be used to hold the bobbin halves together around the stem of the valve dart, without departing from the concepts of the invention as disclosed herein.

A final note about the drawings: detail features shown in the drawings may be enlarged to more clearly depict the feature. Thus, several of the drawings are not precisely to scale.

What is claimed is:

1. A bypass plunger, comprising:
   a cylindrical body comprising:
      a first end,
      a second end opposite the first end;
      a hollow inner bore that extends from the first end to the second end,
      a first opening at the first end that allows fluid to flow into and out of the hollow inner bore, and
      a valve cage having a valve seat formed adjacent the second end;
   a valve dart that is movably mounted within the valve cage, the valve dart comprising:
      a valve head having a sealing face that is configured to engage the valve seat of the valve cage, and
      a stem that extends from the valve head, wherein a portion of the stem has a uniform surface profile that includes a plurality of alternating ribs and grooves, wherein the ribs have a radius of curvature R1 that is between 0.02 inches and 0.15 inches, wherein the grooves have a radius of curvature R2 that is between 0.02 inches and 0.15 inches and wherein a spacing S between adjacent ribs and grooves is between 0.02 inches and 0.075 inches;
   a clutch assembly mounted around the stem of the valve dart; and a retaining nut having one of external threads and internal threads, the other of external threads and internal threads being formed on the second end of the cylindrical body, wherein the retaining nut is secured to the second end of the cylindrical body by the external and internal threads.

2. The bypass plunger of claim 1, wherein R1=R2.

3. The bypass plunger of claim 1, wherein the uniform profile of the stem resembles a sinusoidal wave.

4. The bypass plunger of claim 1, wherein the values of R1, R2 and S remain substantially constant for a majority of a length of the surface profile.

5. The bypass plunger of claim 1, where clutch assembly comprises:

a plurality of curved sections that are assembled together to form the majority of a circumference of a circle; and at least one biasing element that surrounds the plurality of curved sections, wherein the at least one biasing element urges inner surfaces of the plurality of curved sections into engagement with the stem of the valve dart.

6. The bypass plunger of claim 5, wherein at least one groove is formed on an outer surface of each of the plurality of curved sections, and wherein the at least one biasing element is mounted in the at least one groove of the plurality of curved sections.

7. The bypass plunger of claim 6, wherein the at least one biasing element comprises first and second biasing elements, wherein first and second grooves are formed on the outer surfaces of the plurality of curved sections, wherein the first biasing element is mounted in the first grooves of the plurality of curved sections and wherein the second biasing element is mounted in the second grooves of the plurality of curved sections.

8. The bypass plunger of claim 7, wherein the first and second biasing elements comprise first and second springs.

9. The bypass plunger of claim 7, wherein the first and second biasing elements comprise first and second coil springs.

10. The bypass plunger of claim 1, further comprising a fixation element that extends between the cylindrical body and the retaining nut, wherein the fixation element prevents the retaining nut from rotating relative to the cylindrical body.

11. A bypass plunger, comprising:

a hollow cylindrical body having an inlet at a first end and a valve cage at a second opposite end, the valve cage having a valve seat;

a valve dart that is slidably mounted within the valve cage, the valve dart comprising:

a valve head having a sealing face that is configured to engage and disengage from the valve seat as the valve dart slides within the valve cage, and a stem that extends from the valve head, wherein a portion of the stem has a uniform surface profile that includes a plurality of alternating ribs and grooves, wherein the ribs have a radius of curvature R1 that is between 0.02 inches and 0.15 inches a clutch assembly mounted around the stem of the valve dart; and a retaining nut affixed to the second end of the hollow cylindrical body via a threaded connection.

12. The bypass plunger of claim 11, wherein the grooves have a radius of curvature R2 that is between 0.02 inches and 0.15 inches.

13. The bypass plunger of claim 12, wherein R1=R2.

14. The bypass plunger of claim 12, wherein a spacing S between adjacent ribs and grooves is between 0.02 inches and 0.075 inches.

15. The bypass plunger of claim 14, wherein the values of R1, R2 and S remain substantially constant for a majority of a length of the surface profile.

16. The bypass plunger of claim 11, wherein a spacing S between adjacent ribs and grooves is between 0.02 inches and 0.075 inches.

* * * * *